(12) United States Patent
Tanaka

(10) Patent No.: US 10,589,603 B2
(45) Date of Patent: Mar. 17, 2020

(54) VEHICLE DOOR

(71) Applicant: TOYOTA JIDOSHA KABUSHIKI KAISHA, Toyota-shi, Aichi-ken (JP)

(72) Inventor: Shinobu Tanaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/126,411

(22) Filed: Sep. 10, 2018

(65) Prior Publication Data

US 2019/0084386 A1 Mar. 21, 2019

(30) Foreign Application Priority Data

Sep. 15, 2017 (JP) ................. 2017-178033

(51) Int. Cl.
*B60J 5/04* (2006.01)
(52) U.S. Cl.
CPC ........... *B60J 5/0425* (2013.01); *B60J 5/0437* (2013.01); *B60J 5/0443* (2013.01)
(58) Field of Classification Search
CPC ....... B60J 5/0425; B60J 5/0437; B60J 5/0443
USPC ..................................................... 296/146.6
See application file for complete search history.

(56) References Cited

U.S. PATENT DOCUMENTS

| | | | |
|---|---|---|---|
| 6,382,707 B1* | 5/2002 | Dunneback | B60J 5/0425 296/146.6 |
| 9,815,353 B2* | 11/2017 | Jang | B60J 5/048 |
| 2002/0053812 A1* | 5/2002 | Lee | B60J 5/0437 296/146.6 |
| 2007/0210612 A1* | 9/2007 | Kidachi | B60J 5/0418 296/146.6 |
| 2014/0375078 A1* | 12/2014 | Fujihara | B60J 5/0443 296/146.6 |
| 2017/0036521 A1 | 2/2017 | Ogawa | |

FOREIGN PATENT DOCUMENTS

| | | |
|---|---|---|
| JP | 2015-229443 A | 12/2015 |
| JP | 2017-035935 A | 2/2017 |

* cited by examiner

*Primary Examiner* — Joseph D. Pape
(74) *Attorney, Agent, or Firm* — Oliff PLC

(57) ABSTRACT

A vehicle side door internally includes an impact beam which extends along a longitudinal axis of a door. The impact beam is attached to a door inner panel via an outer extension. An inner extension is attached inside the outer extension. A distance along thickness of the door between the inner extension and the impact beam is shorter in a close proximity section than in a longitudinally neighboring area. Because the load received by the inner extension via the close proximity section is transferred to joint portions connecting to the outer extension, the load received by the outer extension from the impact beam is dispersed.

10 Claims, 20 Drawing Sheets

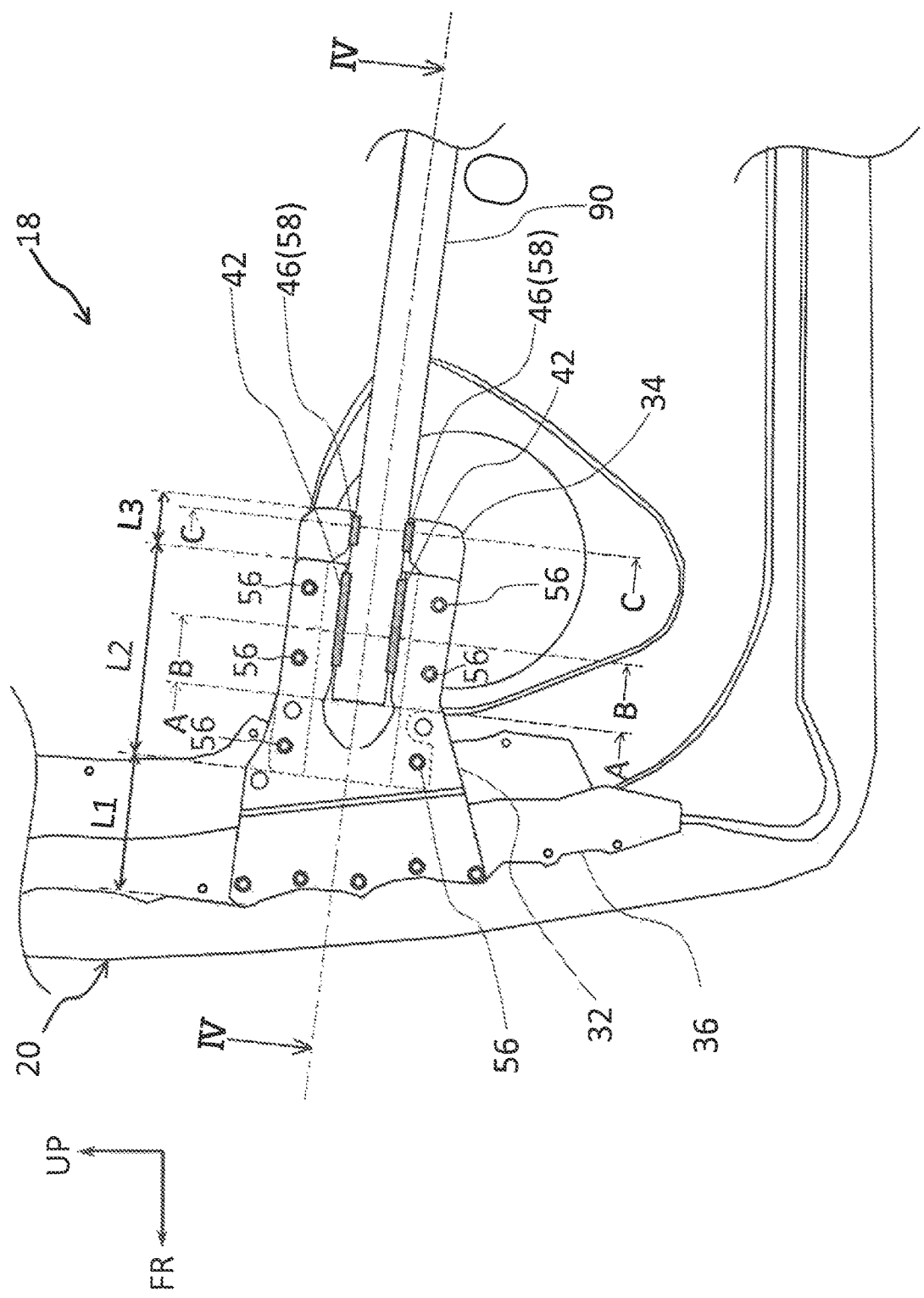

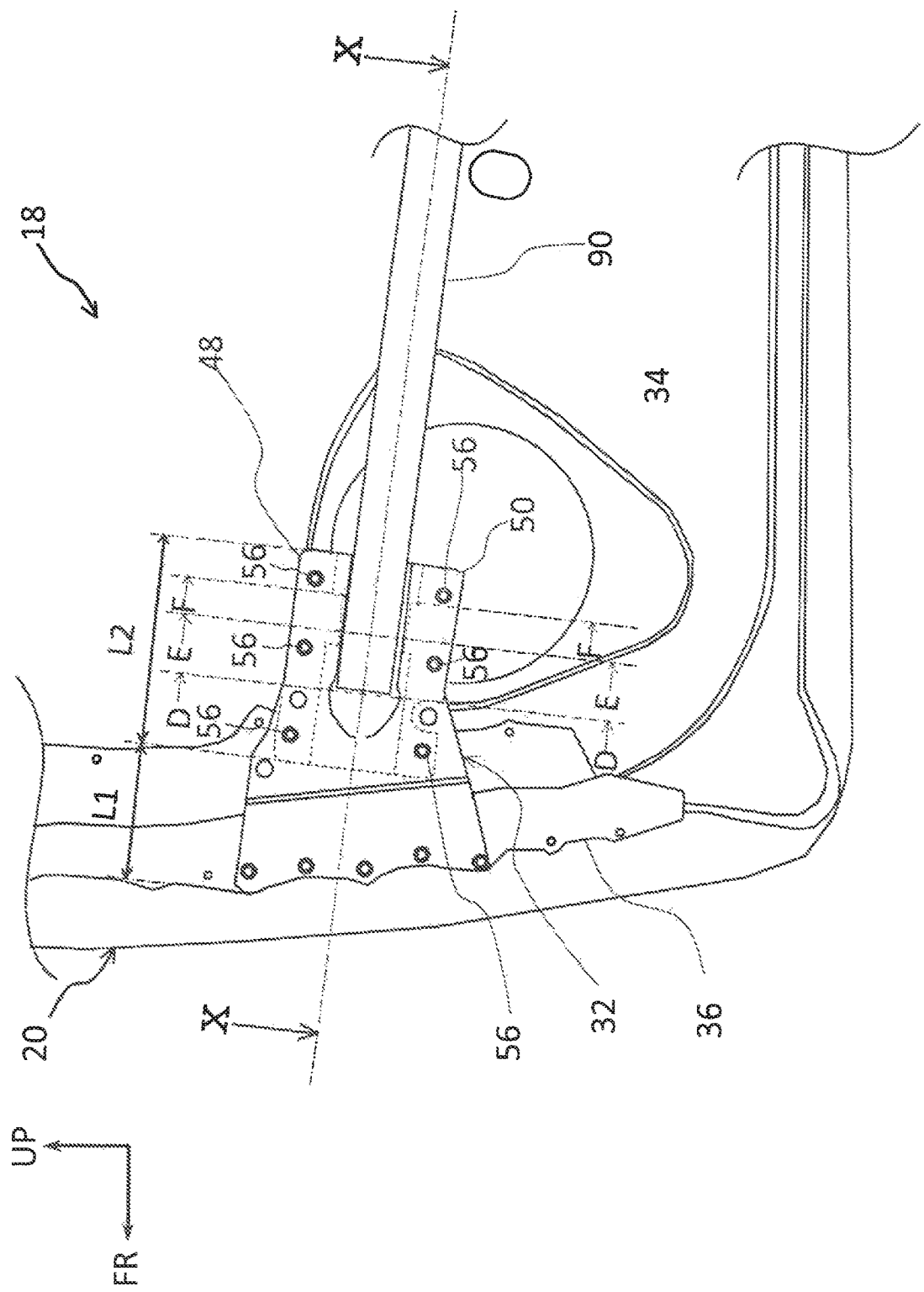

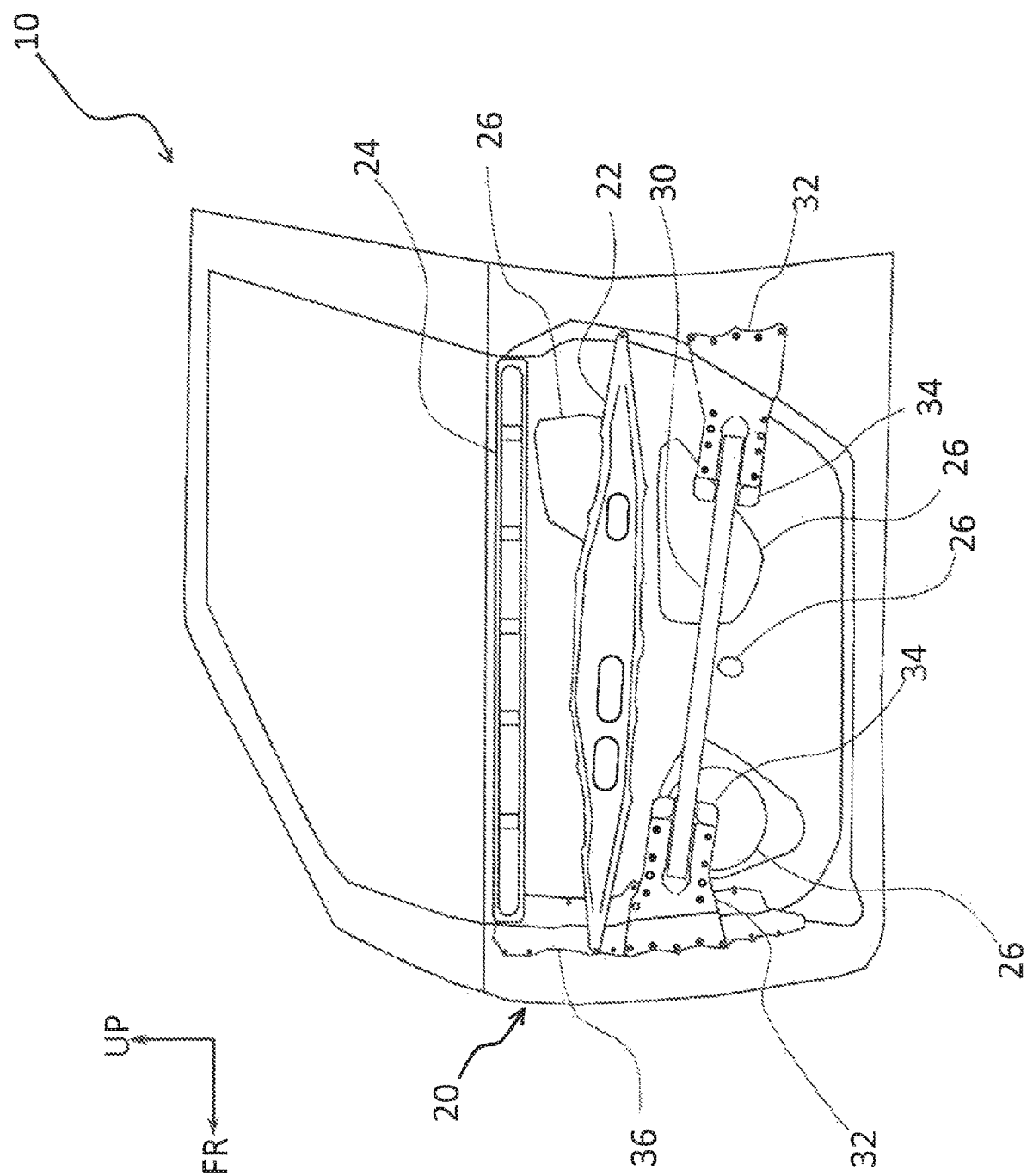

VEHICLE DOOR

CROSS REFERENCE TO RELATED APPLICATION

The disclosure of Japanese Patent Application No. 2017-178033 filed on Sep. 15, 2017 including the specification, claims, drawings, and abstract is incorporated herein by reference in its entirety.

TECHNICAL FIELD

The present disclosure relates to a vehicle door.

BACKGROUND

JP 2017-35935A discloses a frame-shaped metal reinforcement disposed on an inner side of a metal door outer panel. The frame-shaped reinforcement is attached along the periphery of the door outer panel. At a front portion of a side door, front end portions of a first bracket and a second bracket are attached to the frame-shaped reinforcement, and rear end portions of the first and second brackets are attached to a front end portion of a reinforcing element (impact beam) to support the reinforcing element.

SUMMARY

When a vehicle receives an impact load from a side surface around a longitudinal center portion of the vehicle, the inward load along the thickness direction of a side door acts on a reinforcing element inside the side door. The inward load along the thickness direction of the side door is also transferred to a bracket which supports the reinforcing element. In this case, the load is concentrated in an area in which the bracket overlaps the reinforcing element in a side view of the door. The bracket may be stretched inwardly along a transverse axis of the vehicle towards an end portion of the reinforcing element such that the end portion of the reinforcing element comes into contact with the bracket, resulting in an additional load concentrating in such a contact area.

In consideration of such a case, an object of the present disclosure is to provide a vehicle door which realizes a stable load absorption capability by inhibiting contact between an end portion of a reinforcing element and a bracket which supports the reinforcing element, as well as a load concentration in such a contact area.

Solution to Problem

A vehicle door according to the present disclosure includes a reinforcing element disposed inside a door of a vehicle and extending in a longitudinal axis of the door. The vehicle door also includes a first bracket to which the reinforcing element is secured. At least part of the first bracket is disposed on a transversely inner side in relation to the reinforcing element. The vehicle door further includes a second bracket which has two or more joint portions connecting to the first bracket. The second bracket is disposed on a transversely inner side in relation to the first bracket in an area in which at least an end portion of the reinforcing element overlaps the first bracket in a door side view. The reinforcing element is secured to the door by either one or both of the first bracket and the second bracket. In an area overlapped with the reinforcing element in the door side view excluding at the joint portions connecting to the first bracket, the second bracket includes a close proximity section in which a distance along the thickness direction of the door from the reinforcing element is shorter than in a longitudinally neighboring area.

In a vehicle door according to the present disclosure, when a load acts on the reinforcing element from a transversely outer side of the door, a load forcing the first and second brackets towards the inner side of the door is imparted from the reinforcing element. In the present disclosure, in an area overlapped with the reinforcing element in the door side view excluding at the joint portions connecting to the first bracket, the second bracket includes the close proximity section in which a distance along the thickness direction of the door from the reinforcing element is shorter than in a longitudinally neighboring area. In this way, deformation can be inhibited in the overlapping area between the first and second brackets in the door side view. Specifically, a part of the load to be received by the first bracket from the reinforcing element is first transferred from the reinforcing element to the second bracket via the close proximity section, and then from the second bracket to the joint portions connecting to the first bracket. In this way, the load received by the first bracket from the reinforcing element can be dispersed at the first bracket. By inhibiting deformation in the overlapping area between the first bracket and the second bracket in a door side view, contact between an end portion of the reinforcing element and the first bracket as well as a load concentration in such a contact area can be inhibited. This can achieve a stable load absorption capability of the door.

In a vehicle door according to the present disclosure, each of the first bracket and the second bracket may include a pair of flange portions sandwiching an area overlapped with the reinforcing element in the door side view. The joint portions may connect the pair of flanges of the first bracket to the pair of flanges of the second bracket. The first bracket and the second bracket may form a closed cross section perpendicular to the extending axis of the reinforcing element in at least a part of an area along the extending axis of the reinforcing element in which area the first bracket and the second bracket overlap each other in the door side view.

As described above, the pair of flanges of each of the first and second brackets sandwich the portion overlapped with the reinforcing element in the door side view. The joint portions between the first bracket and the second bracket are provided on the flanges. In this way, the load received by the second bracket can be dispersed via the joint portions on both sides of the overlapping area between the first bracket and the reinforcing element in the door side view. In the overlapping area between the first bracket and the second bracket in the door side view, the first bracket and the second bracket form the closed cross section perpendicular to the extending axis of the reinforcing element. In this way, because a larger section modulus can be achieved, deformation of the first bracket can be effectively inhibited such that contact between the end portion of the reinforcing element and the first bracket as well as a load concentration in such a contact area is inhibited. This leads to a stable load absorption capability of the door.

In a vehicle door according to the present disclosure, between the pair of flange portions, the second bracket includes a concave portion which bows transversely inward of the door and is connected between facing edges of the pair of flange portions. In a cross section perpendicular to the extending axis of the reinforcing element including the close proximity section, a distance between the facing edges of the pair of flange portions of the second bracket may be shorter than in a longitudinally neighboring area.

As described above, in a cross section perpendicular to the extending axis of the reinforcing element including the close proximity section, a distance between the facing edges of the pair of flange portions of the second bracket may be shorter than in a longitudinally neighboring area. In this way, a relative transverse displacement between the reinforcing element and the second bracket in the close proximity section can be limited when a load acts on the reinforcing element from a transversely outer side of the door. This can achieve an improved load transfer efficiency from the reinforcing element to the second bracket such that contact between the end portion of the reinforcing element and the first bracket as well as a load concentration in such a contact area can be inhibited. This can lead to a stable load absorption capability of the door.

In a vehicle door according to the present disclosure, the second bracket may include an extension area which extends further towards a center of the door than a center-side end portion of the first bracket. The close proximity section of the second bracket may be disposed in the extension area of the second bracket.

As described above, the close proximity section of the second bracket positioned in a close proximity to the reinforcing element is disposed in the extension area which extends further towards the center of the door than the center-side end portion of the first bracket. In this way, the load from the transversely outer side of the door can be efficiently transferred to the second bracket from the reinforcing element (because when the load acts on the reinforcing element from the transversely outer side of the door, the reinforcing element displaces more on a door center side than on a first bracket side). Thus, a part of the load to be received by the first bracket from the reinforcing element is first transferred from the reinforcing element to the second bracket, and then from the second bracket to the joint portions connecting to the first bracket. In this way, the load received by the first bracket from the reinforcing element can be effectively dispersed, and thus, deformation can be inhibited in the overlapping area between the first bracket and the second bracket in the door side view such that contact between the end portion of the reinforcing element and the first bracket as well as a load concentration in such a contact area can be inhibited. This leads to a stable load absorption capability of the door.

In a vehicle door according to the present disclosure, in the cross section perpendicular to the extending axis of the reinforcing element including the close proximity section of the second bracket, the second bracket may include a connecting portion at which the second bracket is secured to the reinforcing element.

As described above, the second bracket may be connected to the reinforcing element in the cross section of the second bracket perpendicular to the extending axis of the reinforcing element including the close proximity section. In this way, the load from the transversely outer side of the door can be efficiently transferred to the second bracket from the reinforcing element in the close proximity section. By transferring the load from the second bracket to the joint portions connecting to the first bracket, the load received by the first bracket from the reinforcing element can be effectively dispersed. In this way, contact between the end portion of the reinforcing element and the first bracket as well as a load concentration in such a contact area can be inhibited. This can lead a stable load absorption capability of the door.

In a vehicle door according to the present disclosure, in a nonoverlapping area in which the first bracket and the second bracket do not overlap each other in the door side view, the reinforcing element may be attached to a door inner panel of the door by either one of the first bracket and the second bracket.

As described above, the reinforcing element may be connected to the door inner panel by either one of the first bracket and the second bracket in a nonoverlapping area in which the first bracket and the second bracket do not overlap each other in the door side view. In this way, when a load acts on the reinforcing element from the transversely outer side of the door, the bracket connected to the door inner panel can be efficiently deformed in the nonoverlapping area. In this way, the load can be effectively absorbed.

Advantageous Effects of Invention

A vehicle door according to the present disclosure can achieve a stable load absorption capability by inhibiting a load concentration on a bracket to which a reinforcing element inside the door is connected.

BRIEF DESCRIPTION OF DRAWINGS

Embodiments of the present disclosure will be described by reference to the following figures, wherein:

FIG. 6 is a schematic side view of a door showing welded portions between the impact beam and the outer extension and between the impact beam and the inner extension shown in FIG. 2;

FIG. 8 is an enlarged side view of a front portion (a main part) of the door inner assembly having a vehicle door structure according to a second embodiment of the present disclosure, viewed from a transversely outer side of the door;

FIG. 20 is a side view of a door having a vehicle door structure according to a fifth embodiment to which a door inner assembly of the present disclosure is applied also to a rear portion of the door inner assembly, viewed from a transversely outer side of the door.

DESCRIPTION OF EMBODIMENTS

<First Embodiment>

Figure 1:
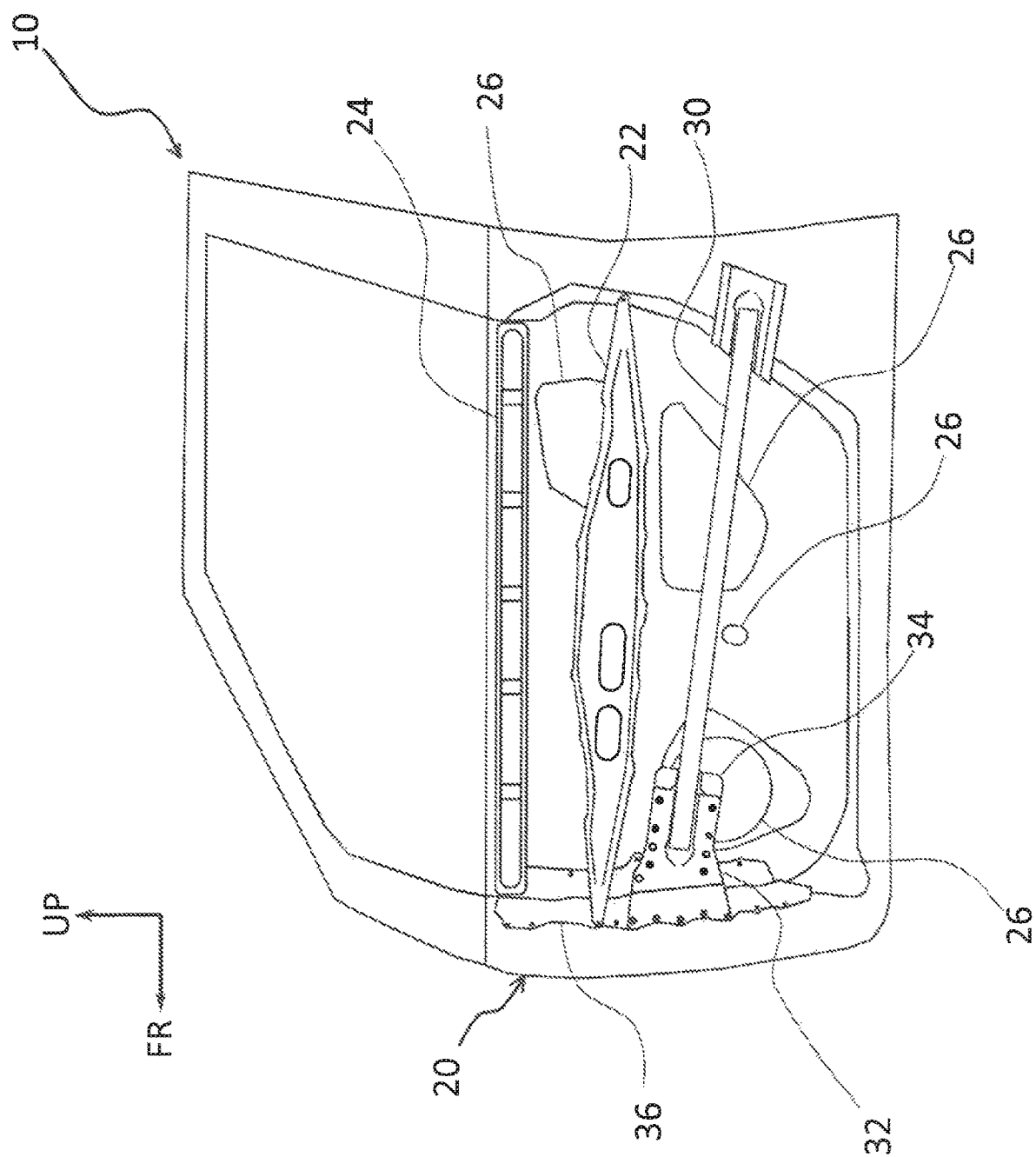
FIG. 1 is a side view of a door inner assembly of a vehicle front side door having a vehicle door structure according to a first embodiment of the present disclosure, viewed from a transversely outer side of the door.

With reference to FIGS. 1 to 7C, a front side door 10 (hereinafter referred to as "side door 10"), which is a vehicle door to which a door structure according to the present disclosure is applied, described below. FIG. 1 is a side view showing main elements of the side door 10 which is a left front door of a vehicle (automobile). Arrows FR, UP, IN, and OUT shown in drawings as necessary indicate the front, up, and transversely inner and outer sides of the side door 10, respectively. In the description below, unless otherwise indicated, positions such as "front," "rear," "up," and "down" indicate the positions in relation to the side door 10. The present disclosure is not limited to the embodiments described below. The description below and drawings are simplified as necessary.

The side door 10 is pivotably assembled between open and closed positions to the vehicle body about a vertical axis of the door at the front of the door by an upper hinge 12 and a lower hinge 14 (both not shown). When the side door 10 is assembled to the vehicle body and closed, the orientation of the thickness of the side door 10 accords with a transverse axis of the vehicle such that an outer side of the door is on a transversely outer side of the vehicle and an inner side of the door is on a transversely inner side of the vehicle. Similarly, in this state, the up and down directions of the door accord with the up and down directions of the vehicle and the front and rear directions of the door accord with the front and rear directions of the vehicle. The side door 10 includes a door outer assembly 16 which forms an outer side of the side door 10, and a door inner assembly 18 which forms an inner side of the side door 10.

<Door Inner Assembly>

As shown in FIG. 1, the door inner assembly 18 includes a door inner panel 20, an outer side reinforcement (RF) 22, and a beltline reinforcement (RF) 24. The door inner panel 20 includes two or more service holes 26 which enables access to components disposed inside the side door 10 for wiring or other purposes. A door trim 28 (not shown) is disposed on an inner side of the door inner assembly 18. A front portion of the door inner assembly 18 which is a main part of the present embodiment is described below.

<Front Portion of Door Inner Assembly>

Figure 2:
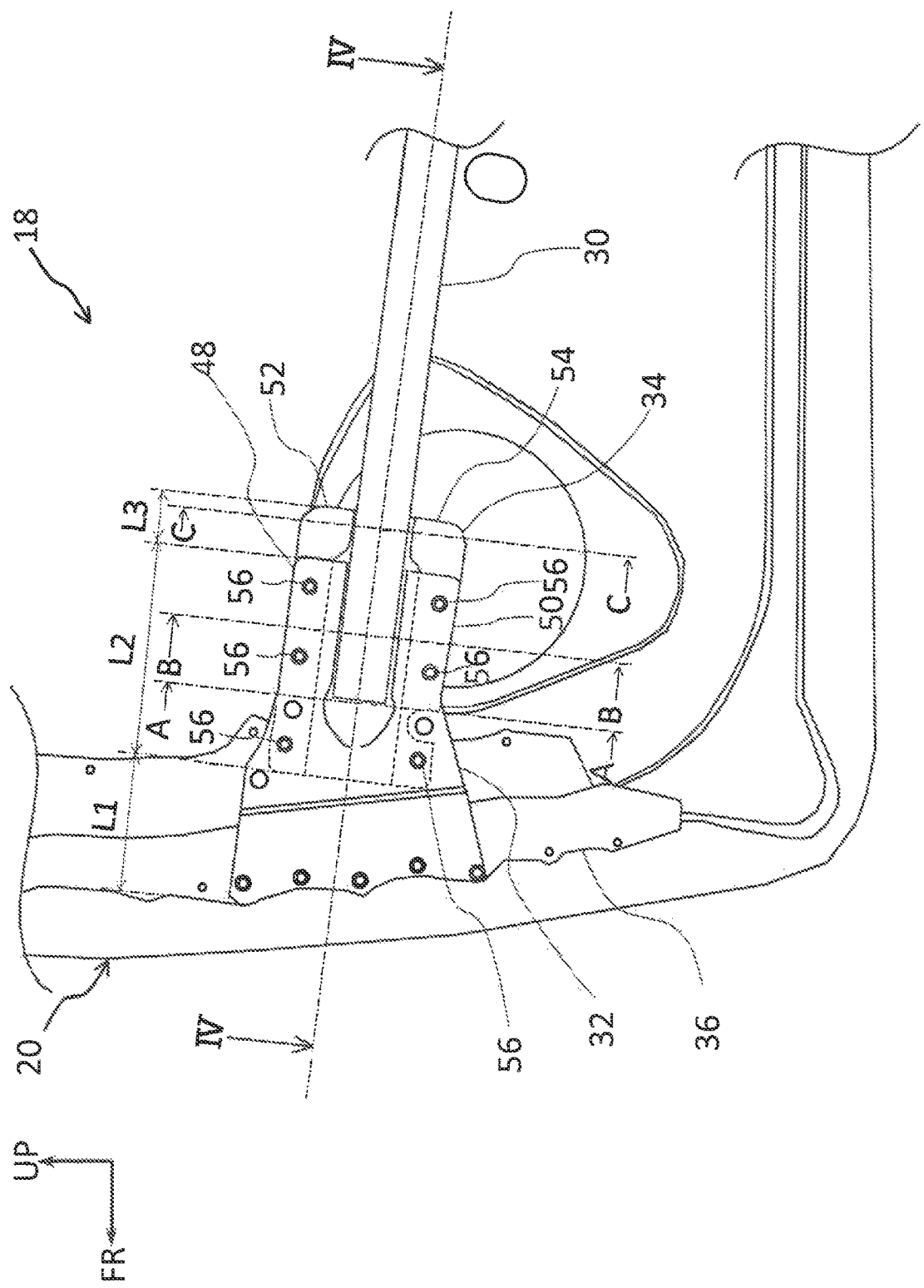
FIG. 2 is an enlarged view of a front portion (a main part) of the door inner assembly shown in FIG. 1, viewed from a transversely outer side of the door.
Figure 3:
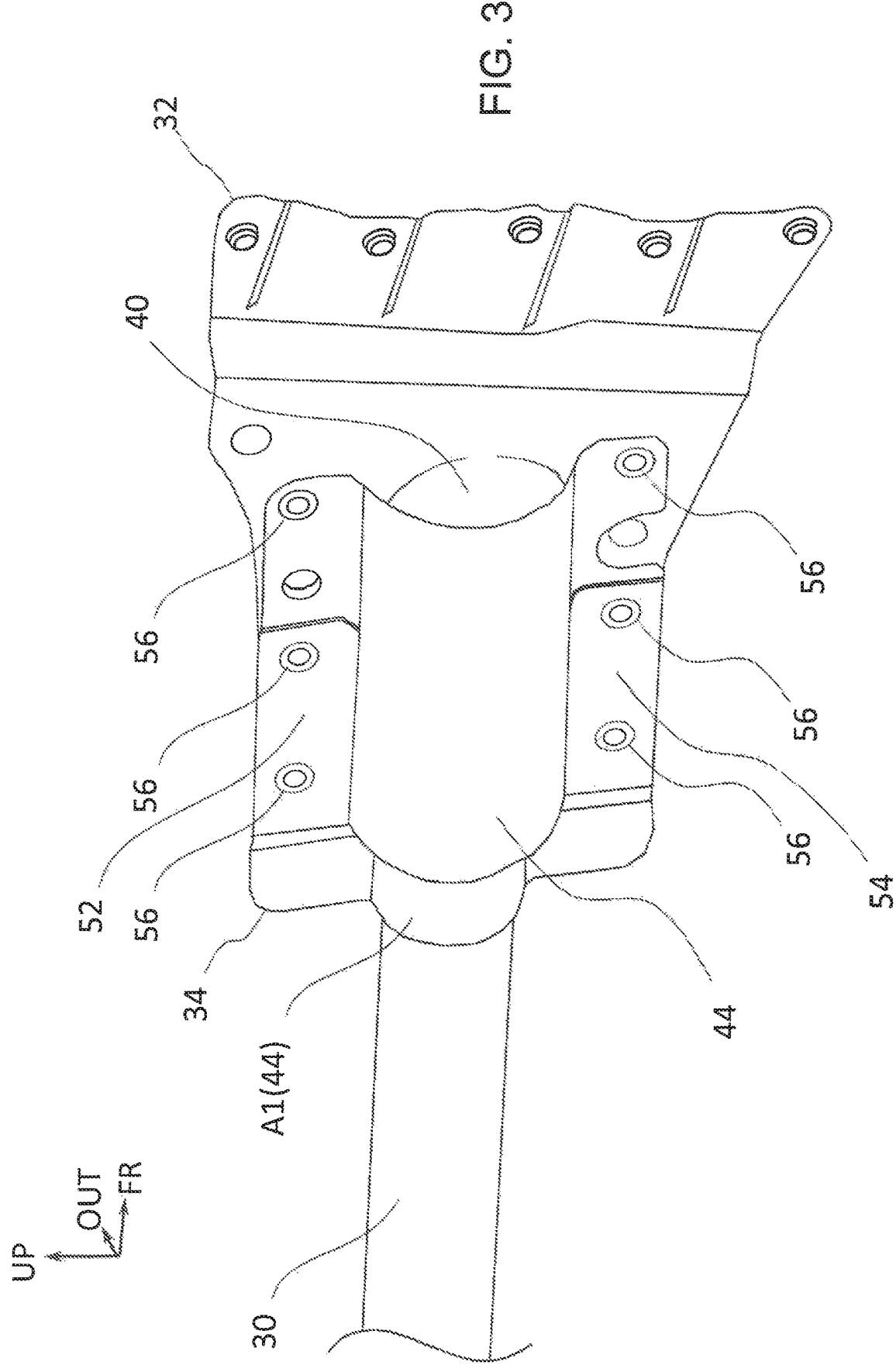
FIG. 3 is a perspective diagram showing an outer extension, an inner extension, and an impact beam of the vehicle door according to the first embodiment, viewed from a transversely inner side of the door.
Figure 4:
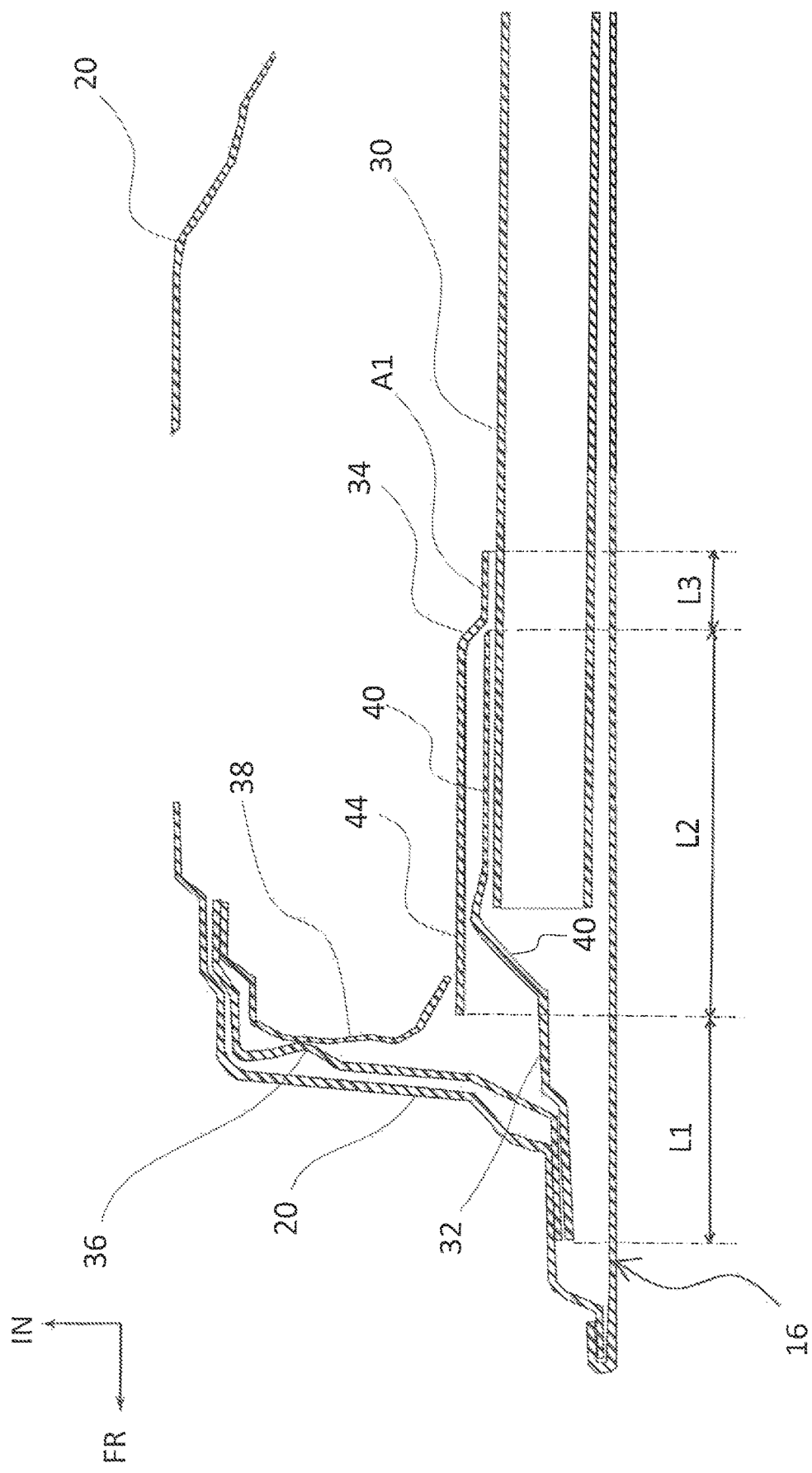
FIG. 4 is a cross sectional view of the door inner assembly shown in FIG. 2 taken along line IV-IV, viewed from the top of the door.

As shown in FIGS. 2 to 4, the door inner assembly 18 further includes an impact beam 30 (corresponding to the reinforcing element), an impact beam outer extension 32 (corresponding to the first bracket, hereinafter referred to as "outer extension") which attaches the impact beam 30 to the door inner panel 20, an impact beam inner extension 34 (corresponding to the second bracket, hereinafter referred to as "inner extension") which is disposed on an inner side in relation to the outer extension in a door side view to reinforce the outer extension 32, a hinge side panel 36, and a door check reinforcement 38. These elements are made of a metal material (aluminum-base or high tensile steel material). Each element of the front portion of the door inner assembly 18 is described in detail below.

<Impact Beam>

As described in FIGS. 1 to 7C, the impact beam 30 is disposed inside the door and extends substantially along a longitudinal axis of the door. The impact beam 30 does not necessarily extend exactly along the longitudinal axis of the door. In the present embodiment, the impact beam 30 has a tubular shape and is made of a metal material (aluminum-base or high tensile steel material). As shown in FIGS. 6 and 7A to 7C, the impact beam 30 is arc welded to the outer extension 32 by forming welded portions 42 connecting the impact beam 30 and the outer extension 32 to secure the impact beam 30 on a transversely outer side in relation to the outer extension 32. Each welded portion 42 is positioned at a concave portion 40 of the outer extension 32 in an overlapping area L2 described below. The impact beam 30 is also arc welded to the inner extension 34 on a longitudinally center side (on a rear side in the present embodiment) in relation to the welded portion between the impact beam 30 and the outer extension 32 by forming welded portions 46 connecting the impact beam 30 and the inner extension 34 to secure the impact beam 30 on a transversely outer side in relation to the inner extension 34. Each welded portion 46 is positioned at a concave portion 44 of the inner extension 34 in an extension area L3 described below. Shaded portions in FIGS. 6 and 7A to 7C indicate the welded portions 42 connecting the impact beam 30 and the outer extension 32 and the welded portions 46 connecting the impact beam 30 and the inner extension 34, respectively. The welded portions 42 may be disposed around facing edges of a pair of flange portions 48, 50 of the outer extension 32 described below, whereas the welded portions 46 may be disposed around facing edges of a pair of flange portions 52, 54 of the inner extension 34 described below.

<Outer Extension>

As shown in FIGS. 1 to 7C, at one end (the front end in the present embodiment), the outer extension 32 forms a nonoverlapping area L1 in which the outer extension 32 is not overlapped with the inner extension 34 in the door side view. With the hinge side panel 36, the outer extension 32 is connected to the door inner panel 20 at a front end portion in the nonoverlapping area L1 by welding, bolting, or other means. At the other end portion which is on the longitudinally center side of the door (on the rear side in the present embodiment), the pair of flange portions 48, 50 extending along the longitudinal axis of the door are disposed so that the flange portions 48, 50 sandwich a portion overlapped with the impact beam 30 in a side view of the door.

Figure 5C:
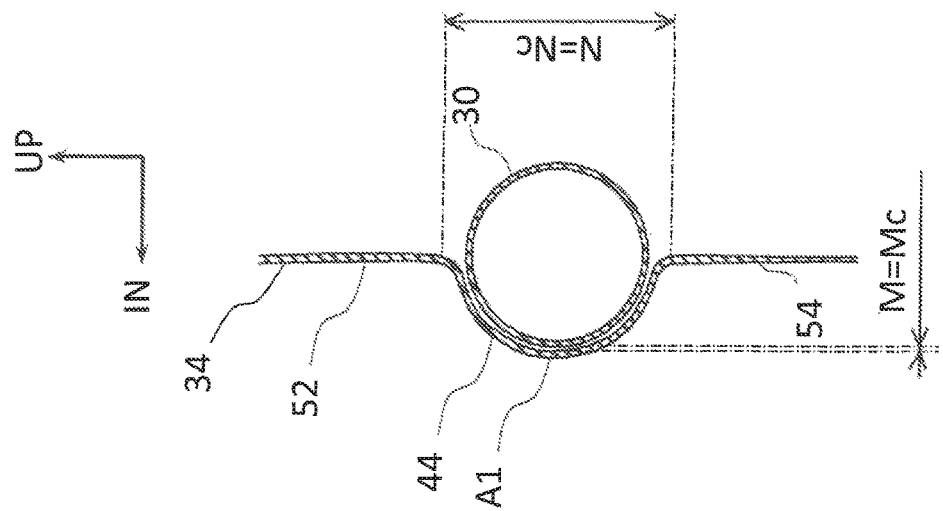
FIG. 5C is a cross sectional view of the inner extension and the impact beam shown in FIG. 2 taken along line C-C which is perpendicular to the extending axis of the impact beam, viewed from the front of the door.
Figure 5B:
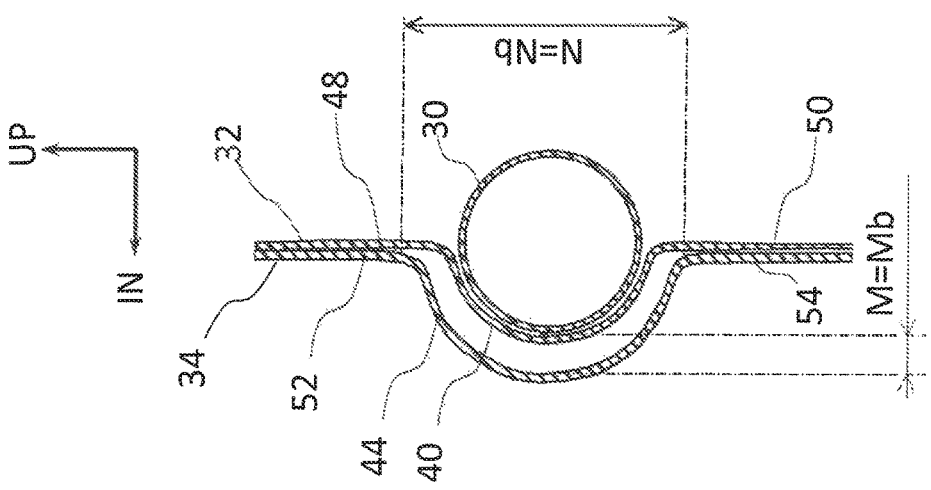
FIG. 5B is a cross sectional view of the outer extension, the inner extension, and the impact beam shown in FIG. 2 taken along line B-B which is perpendicular to the extending axis of the impact beam, viewed from the front of the door.
Figure 5A:
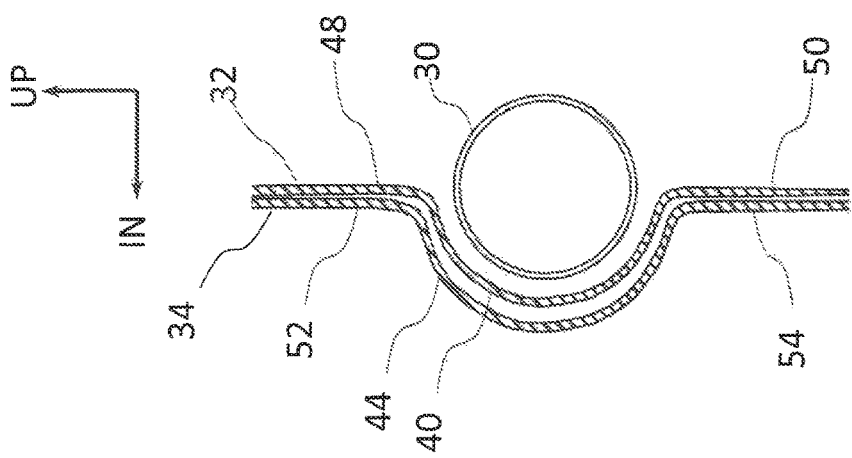
FIG. 5A is a cross sectional view of the outer extension, the inner extension, and the impact beam shown in FIG. 2 taken along line A-A which is perpendicular to an extending axis of the impact beam, viewed from the front of the door.
Figure 7C:
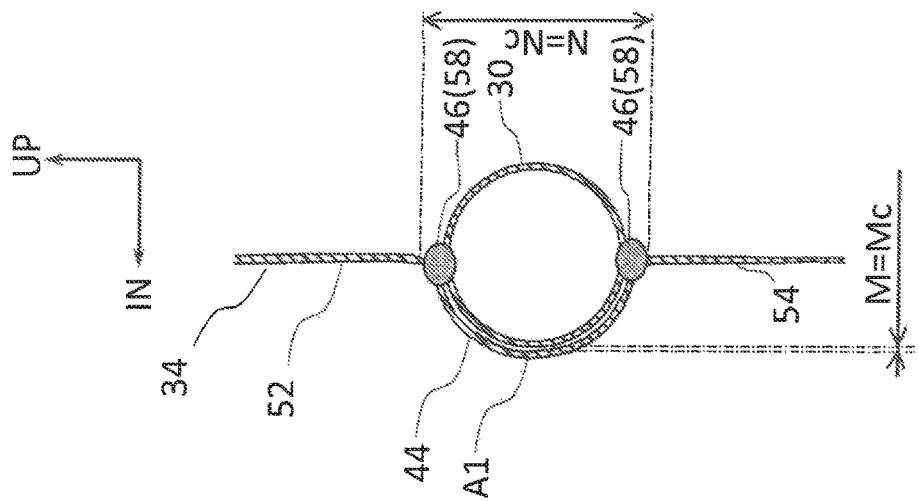
FIG. 7C is a cross sectional view of the inner extension and the impact beam shown in FIG. 6 taken along line C-C which is perpendicular to the extending axis of the impact beam, viewed from the front of the door.
Figure 7B:
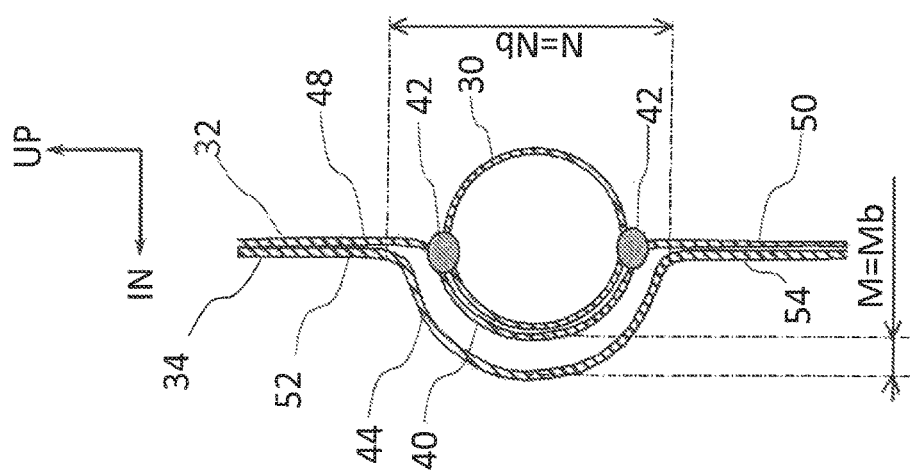
FIG. 7B is a cross sectional view of the outer extension, the inner extension, and the impact beam shown in FIG. 6 taken along line B-B which is perpendicular to the extending axis of the impact beam, viewed from the front of the door.
Figure 7A:
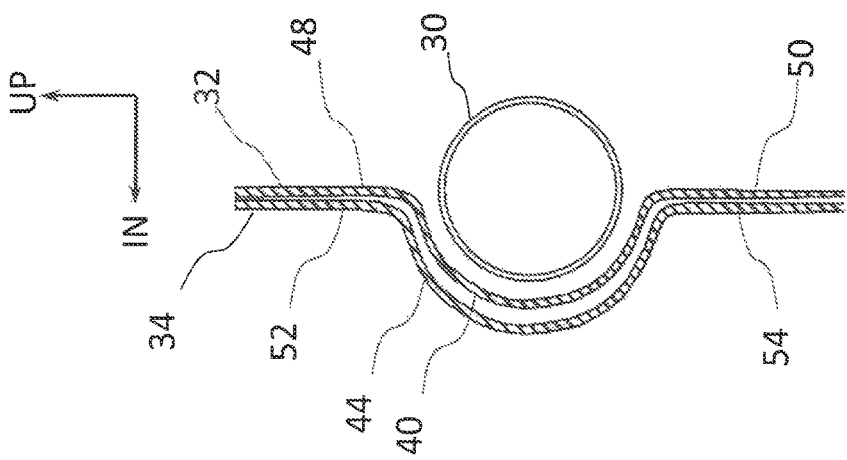
FIG. 7A is a cross sectional view of the outer extension, the inner extension, and the impact beam shown in FIG. 6 taken along line A-A which is perpendicular to an extending axis of the impact beam, viewed from the front of the door.
Figure 9:
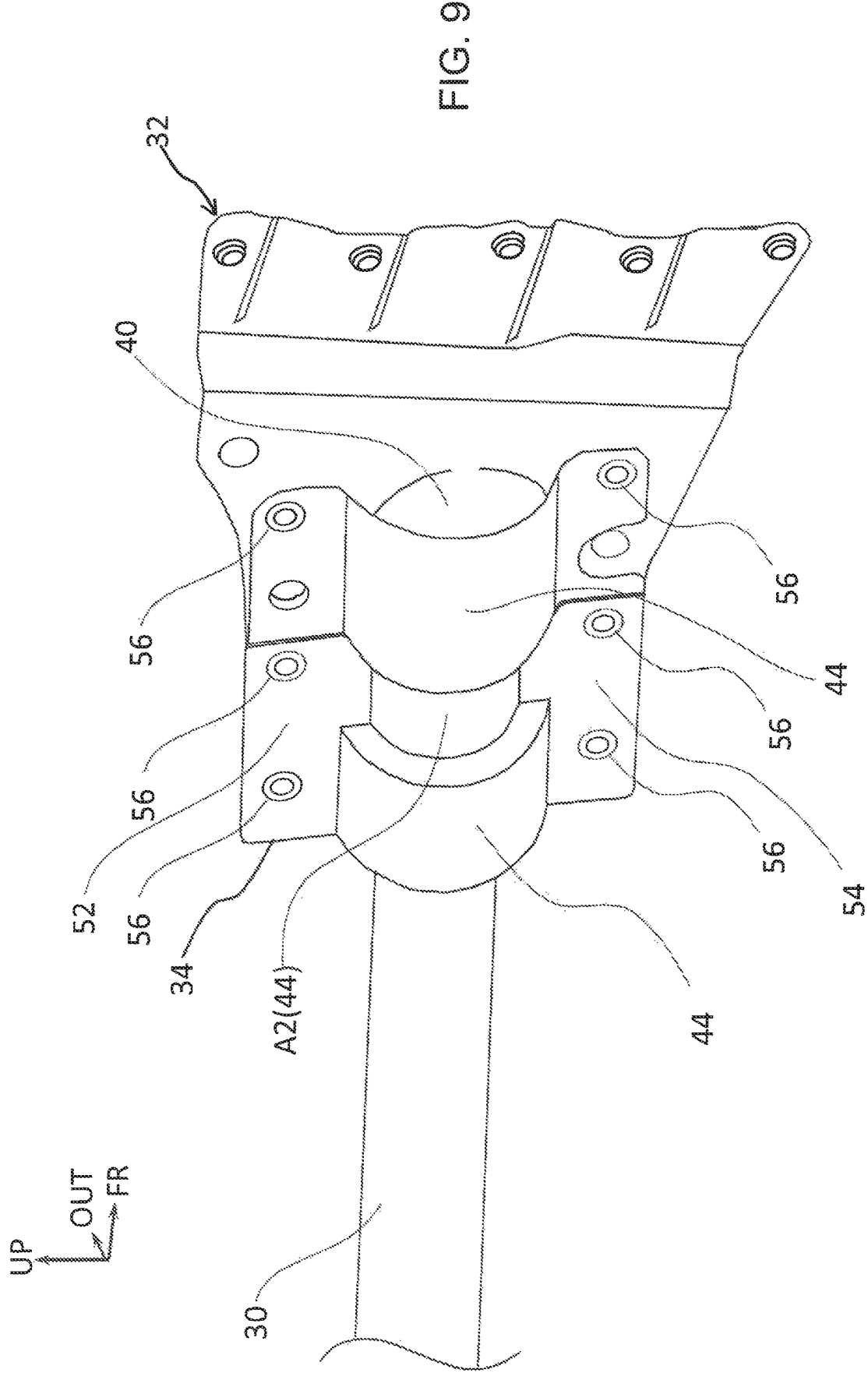
FIG. 9 (corresponding to FIG. 3) is a perspective diagram showing an outer extension, an inner extension, and an impact beam of the vehicle door according to the second embodiment, viewed from a transversely inner side of the door.
Figure 10:
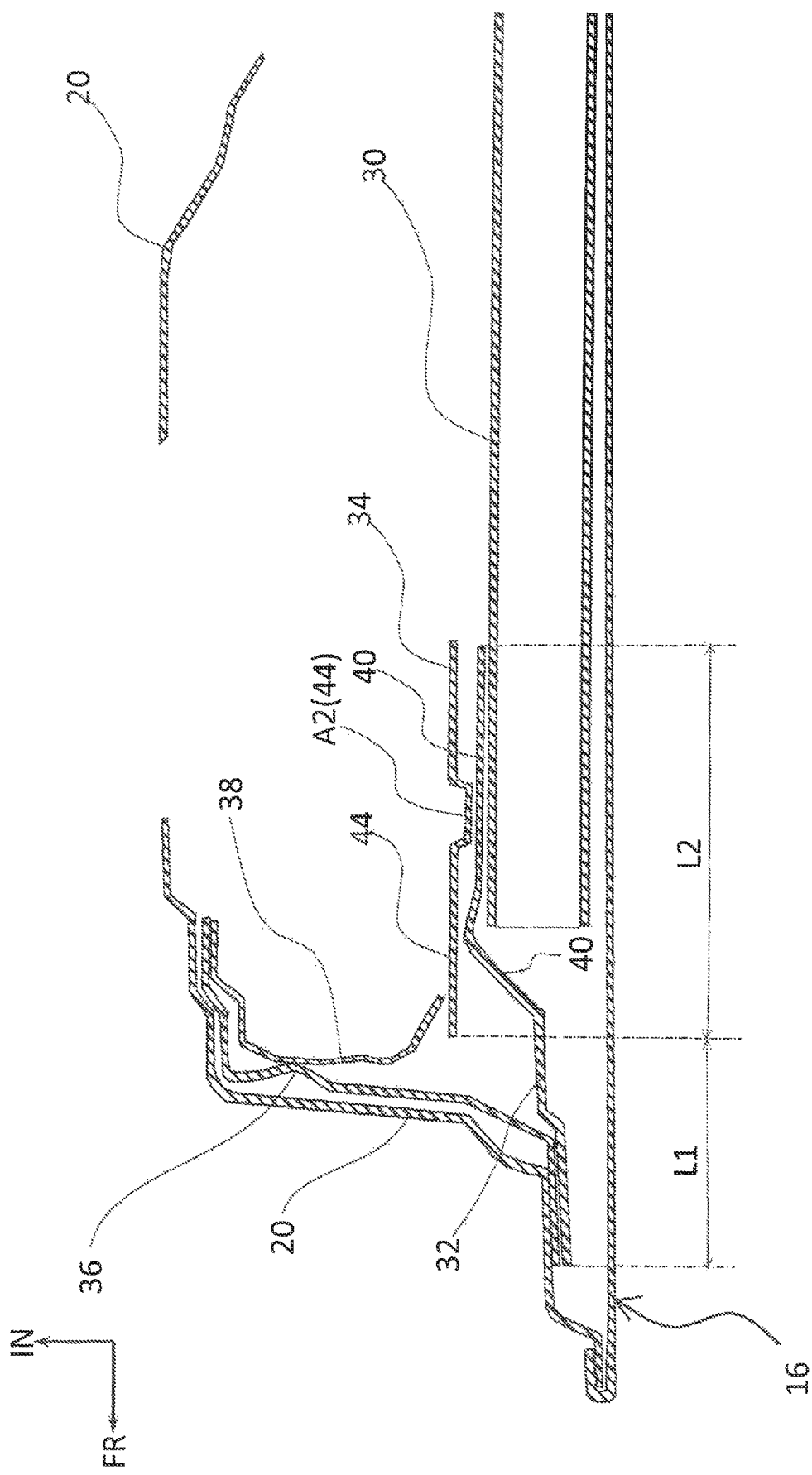
FIG. 10 is a cross sectional view of the door inner assembly shown in FIG. 8 taken along line X-X, viewed from the top of the door.
Figure 11C:
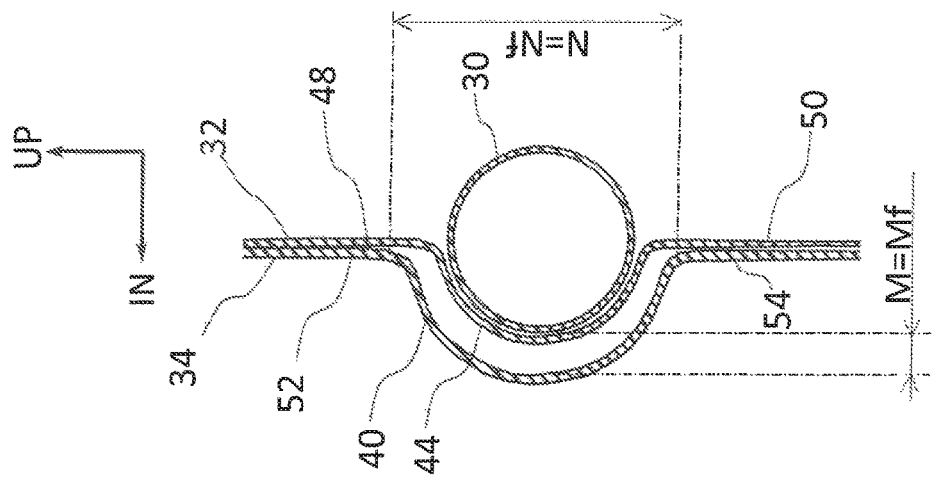
FIG. 11C is a cross sectional view of the outer extension, the inner extension, and the impact beam shown in FIG. 8 taken along line F-F which is perpendicular to the extending axis of the impact beam, viewed from the front of the door.
Figure 11B:
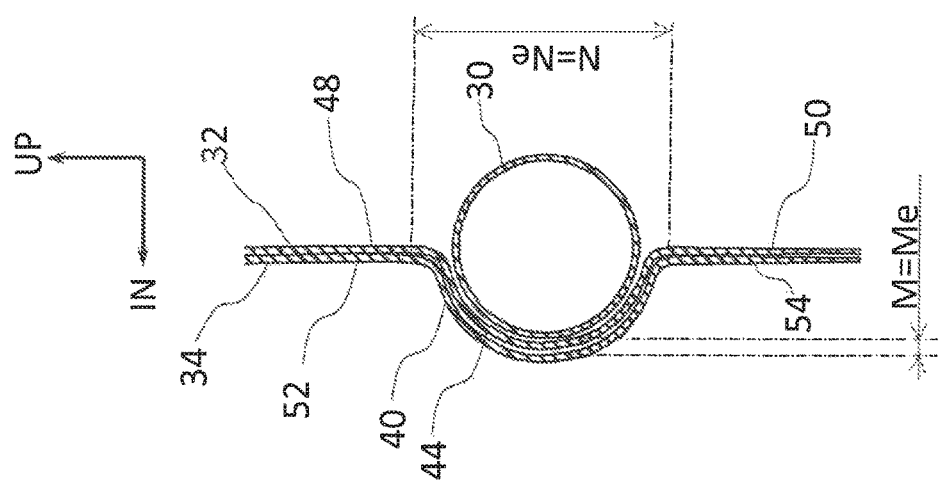
FIG. 11B is a cross sectional view of the outer extension, the inner extension, and the impact beam shown in FIG. 8 taken along line E-E which is perpendicular to the extending axis of the impact beam, viewed from the front of the door.
Figure 11A:
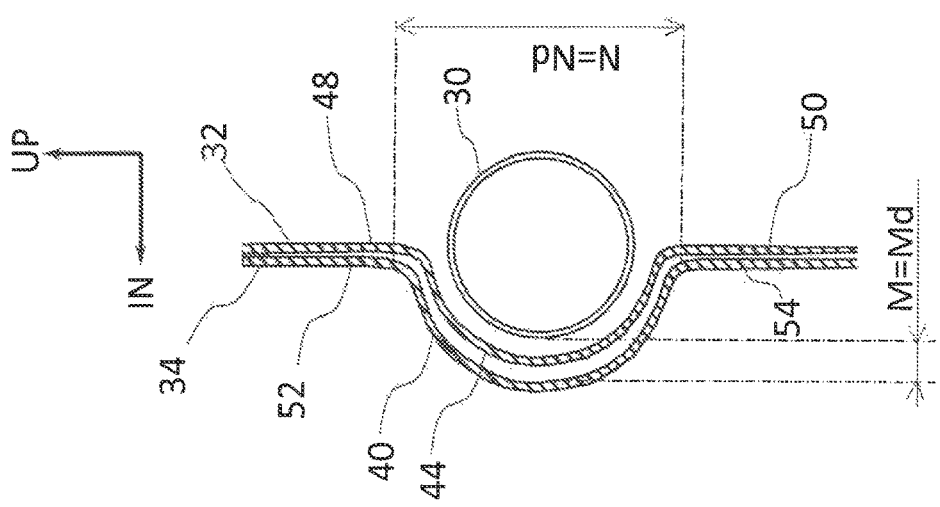
FIG. 11A is a cross sectional view of the outer extension, the inner extension, and the impact beam shown in FIG. 8 taken along line D-D which is perpendicular to an extending axis of the impact beam, viewed from the front of the door.
Figure 12:
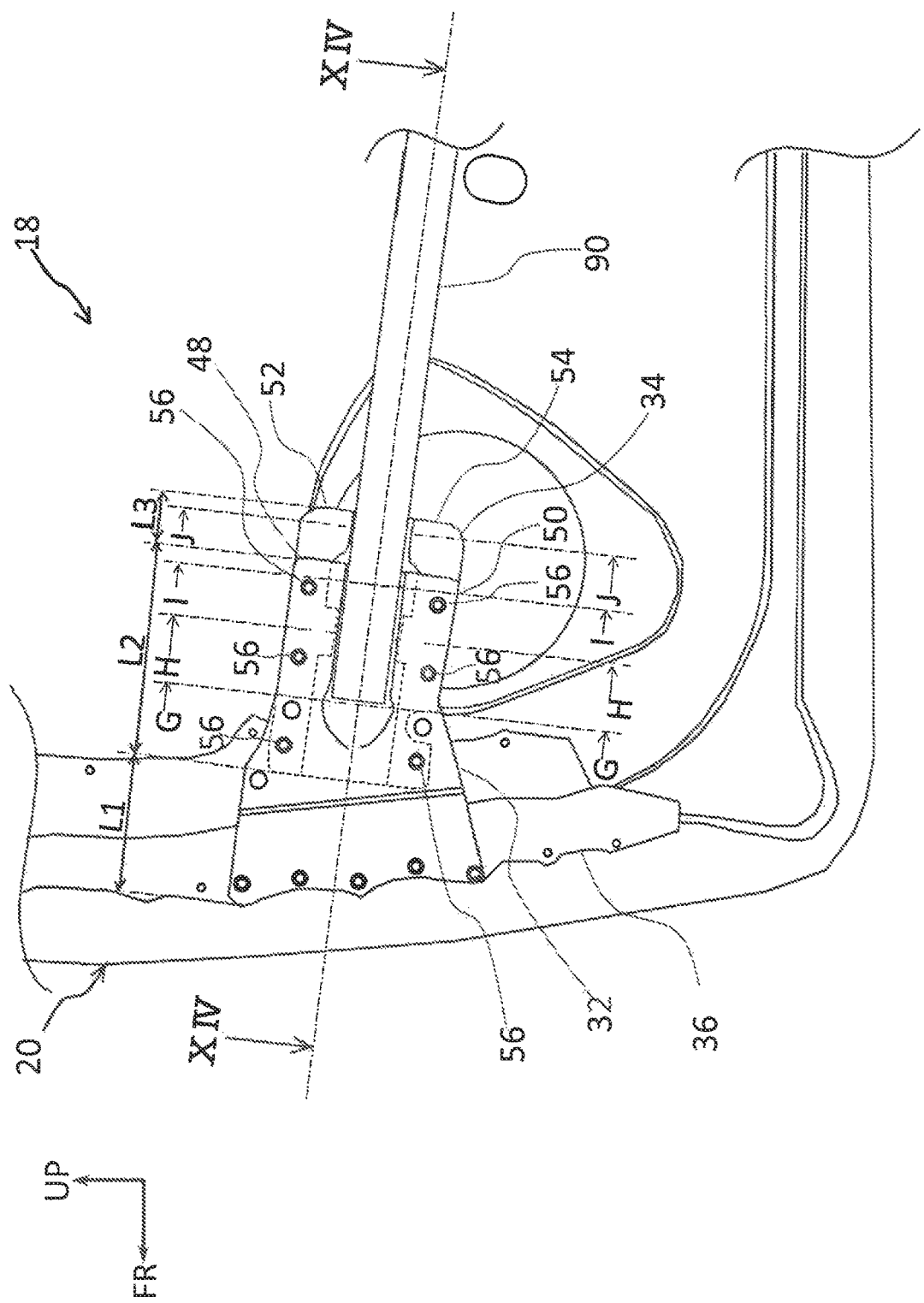
FIG. 12 is an enlarged side view of a front portion (a main part) of the door inner assembly having a vehicle door structure according to a third embodiment of the present disclosure, viewed from a transversely outer side of the door.
Figure 13:
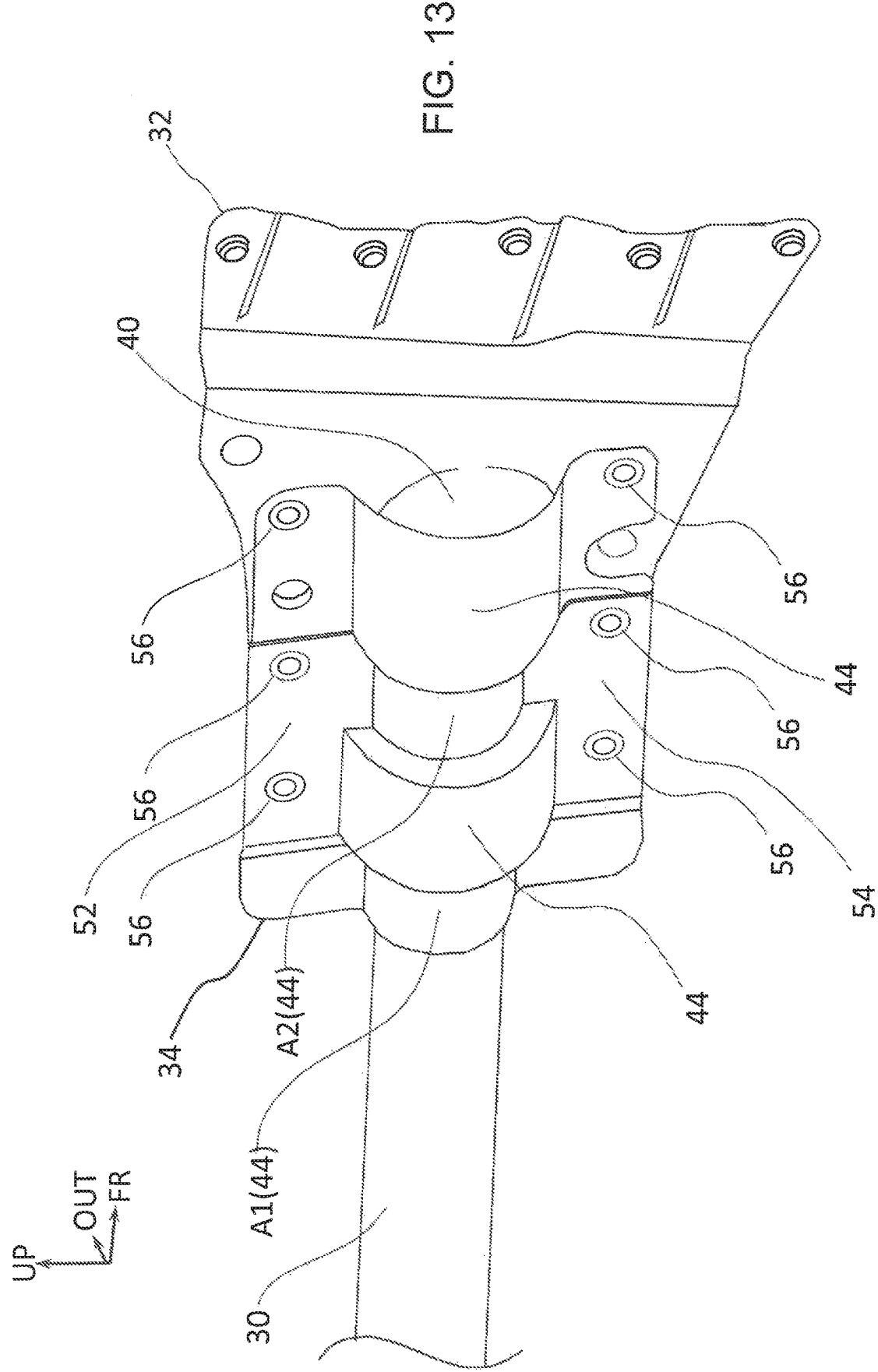
FIG. 13 is a perspective diagram showing an outer extension, an inner extension, and an impact beam of the vehicle door according to the third embodiment, viewed from a transversely inner side of the door.
Figure 14:
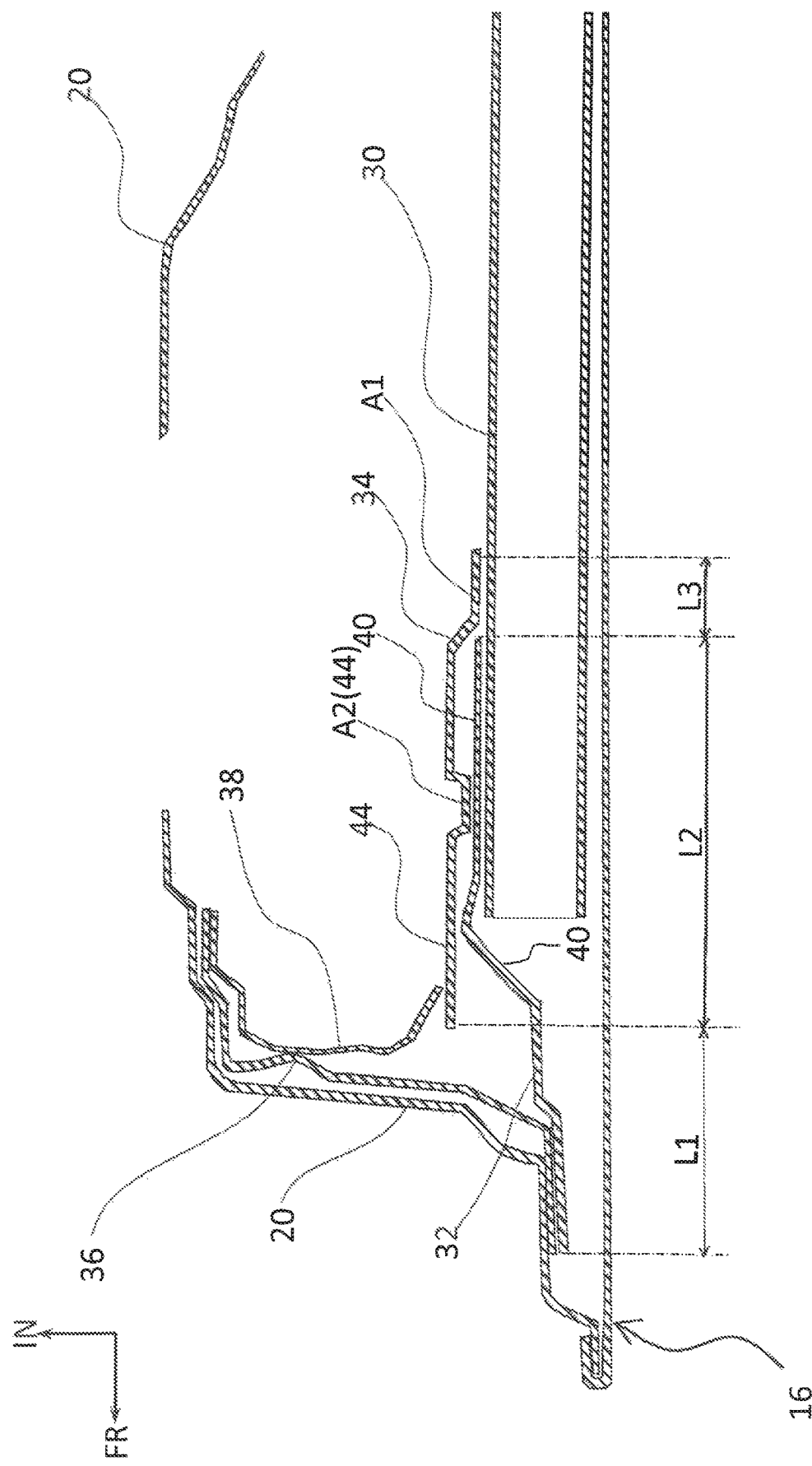
FIG. 14 is a cross sectional view of the door inner assembly shown in FIG. 12 taken along line XIV-XIV, viewed from the top of the door.
Figure 15D:
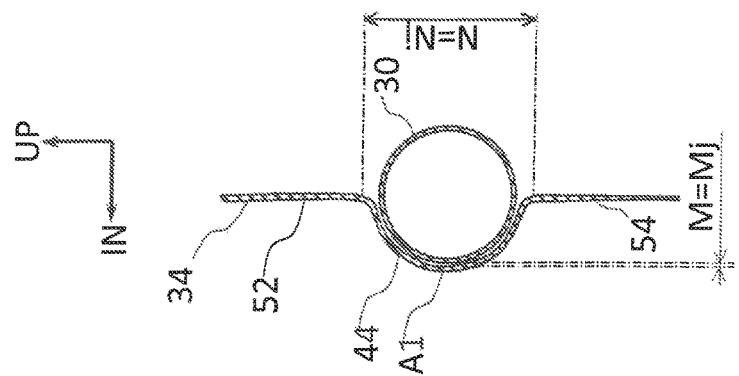
FIG. 15D is a cross sectional view of the inner extension and the impact beam shown in FIG. 12 taken along line J-J which is perpendicular to the extending axis of the impact beam, viewed from the front of the door.
Figure 15C:
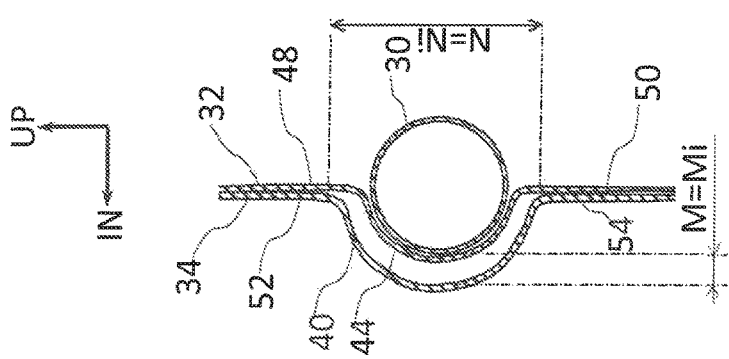
FIG. 15C is a cross sectional view of the outer extension, the inner extension, and the impact beam shown in FIG. 12 taken along line I-I which is perpendicular to the extending axis of the impact beam, viewed from the front of the door.
Figure 15B:
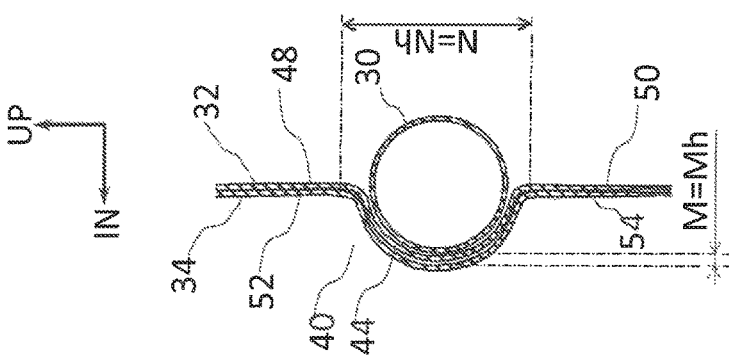
FIG. 15B is a cross sectional view of the outer extension, the inner extension, and the impact beam shown in FIG. 12 taken along line H-H which is perpendicular to the extending axis of the impact beam, viewed from the front of the door.
Figure 15A:
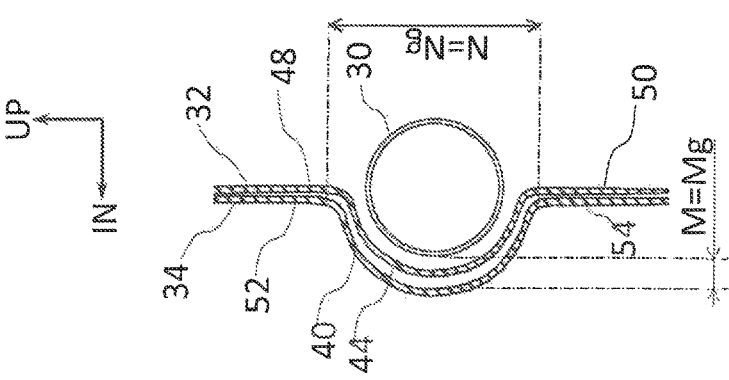
FIG. 15A is a cross sectional view of the outer extension, the inner extension, and the impact beam shown in FIG. 12 taken along line G-G which is perpendicular to an extending axis of the impact beam, viewed from the front of the door.
Figure 16:
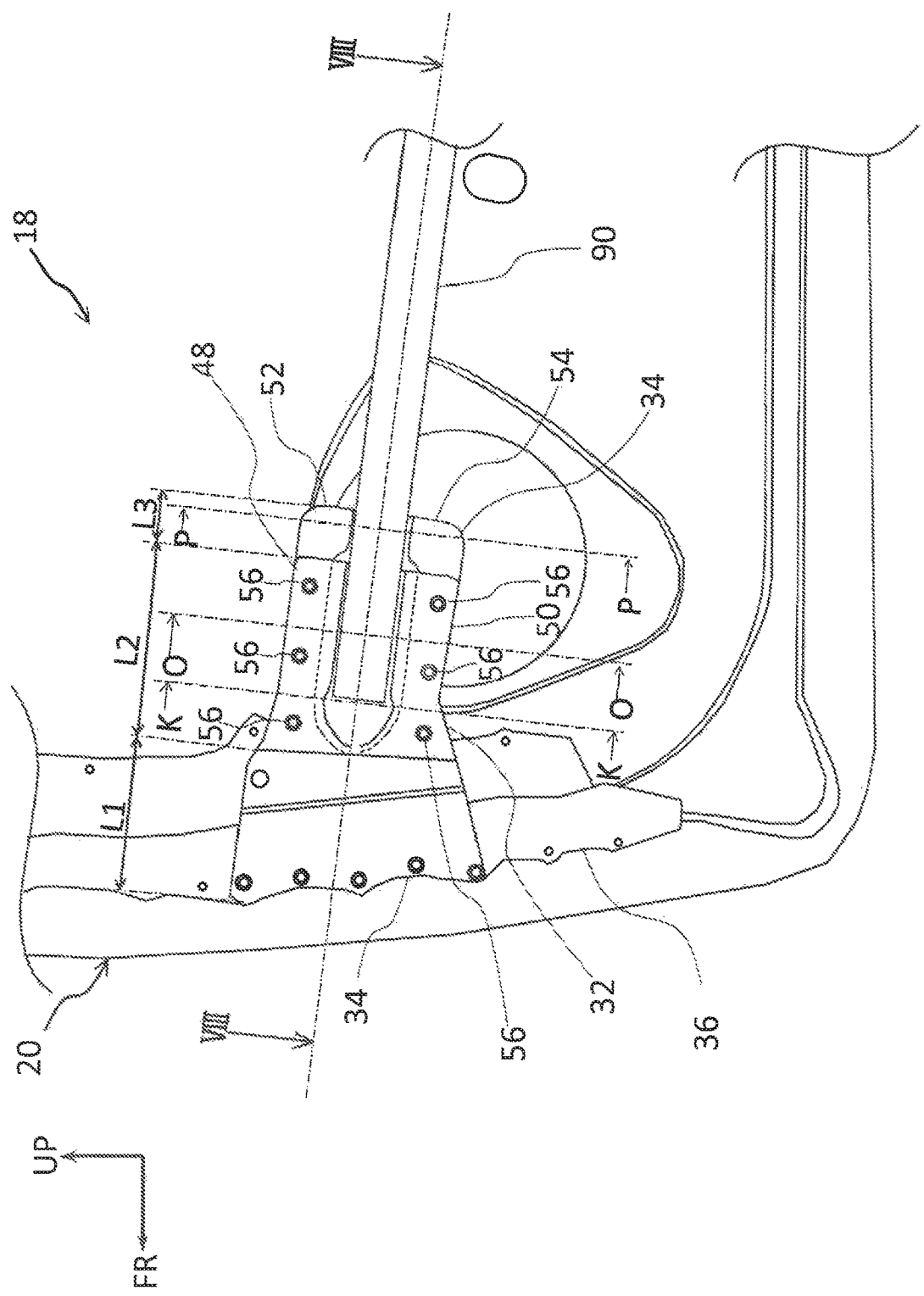
FIG. 16 is an enlarged side view of a front portion (a main part) of the door inner assembly having a vehicle door structure according to a fourth embodiment of the present disclosure, viewed from a transversely outer side of the door.
Figure 17:
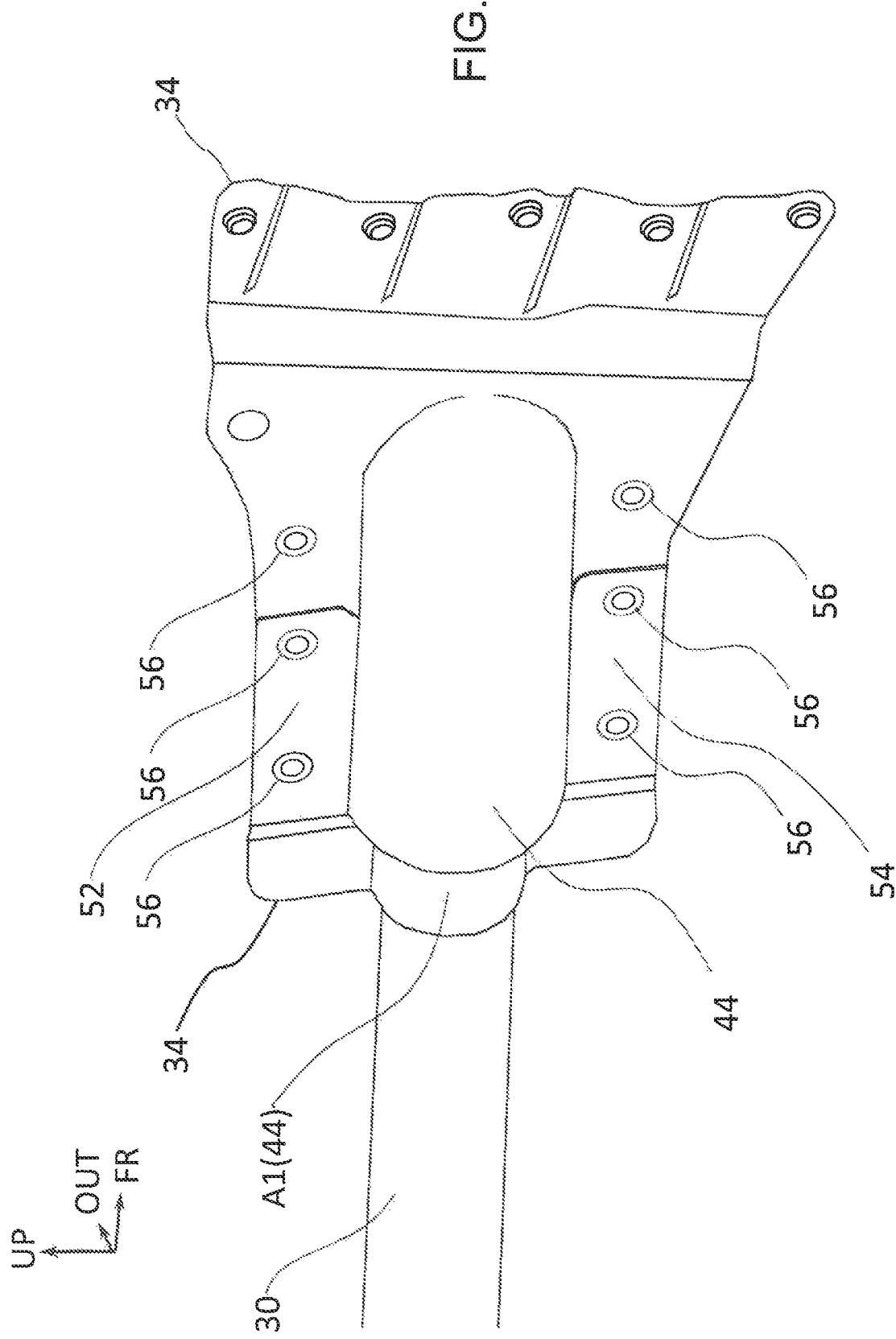
FIG. 17 is a perspective diagram showing an inner extension and an impact beam of the vehicle door according to the fourth embodiment, viewed from a transversely inner side of the door.
Figure 18:
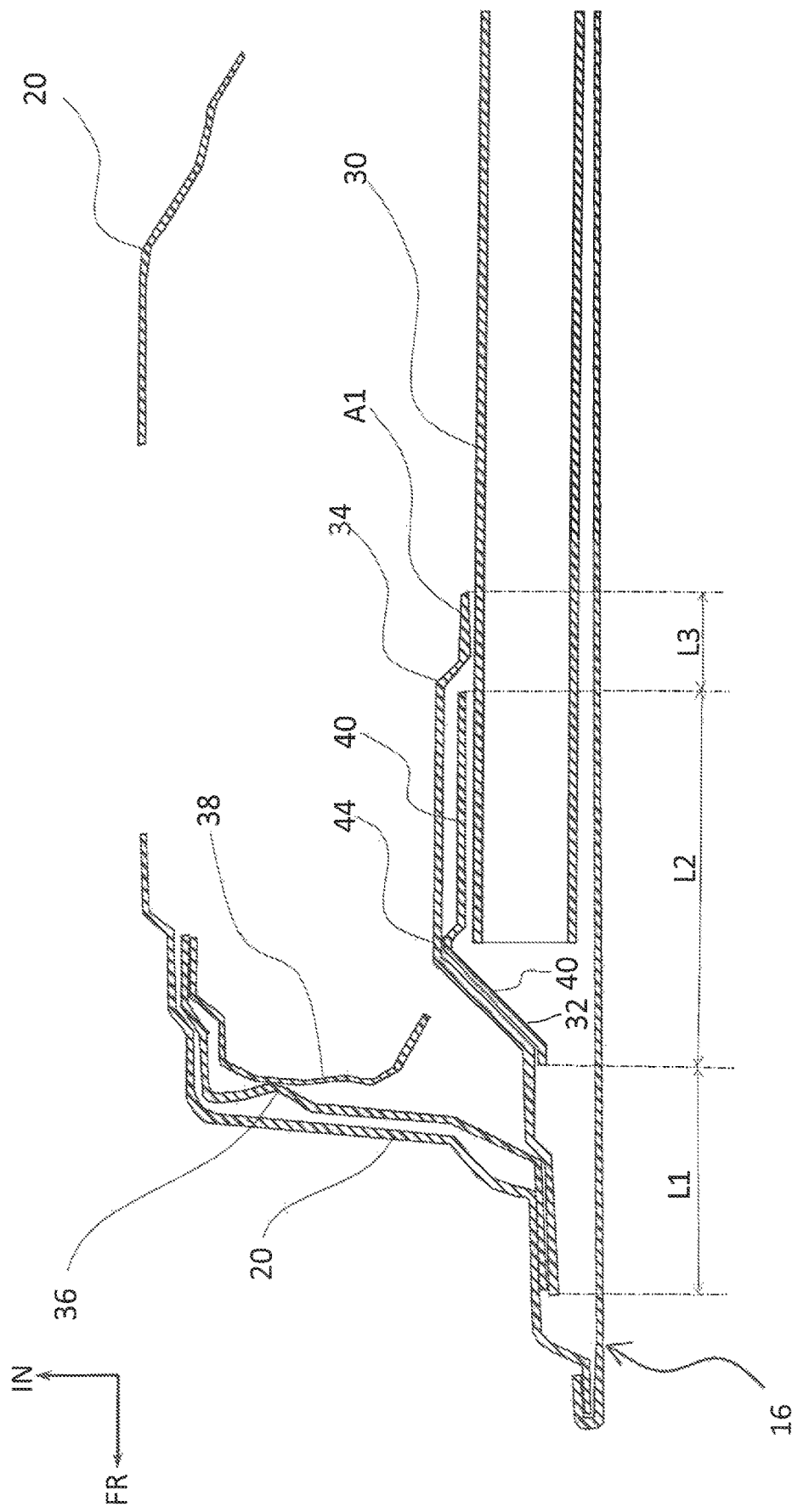
FIG. 18 is a cross sectional view of the door inner assembly shown in FIG. 16 taken along line XVIII-XVIII, viewed from the top of the door.
Figure 19C:
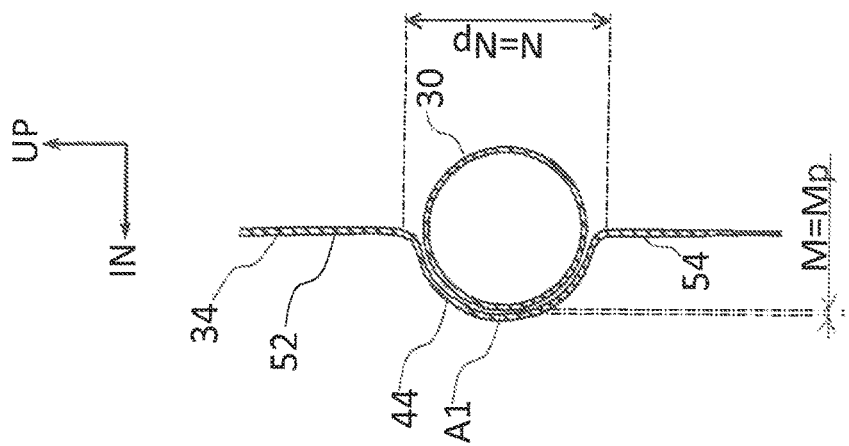
FIG. 19C is a cross sectional view of the inner extension and the impact beam shown in FIG. 16 taken along line P-P which is perpendicular to the extending axis of the impact beam, viewed from the front of the door.
Figure 19B:
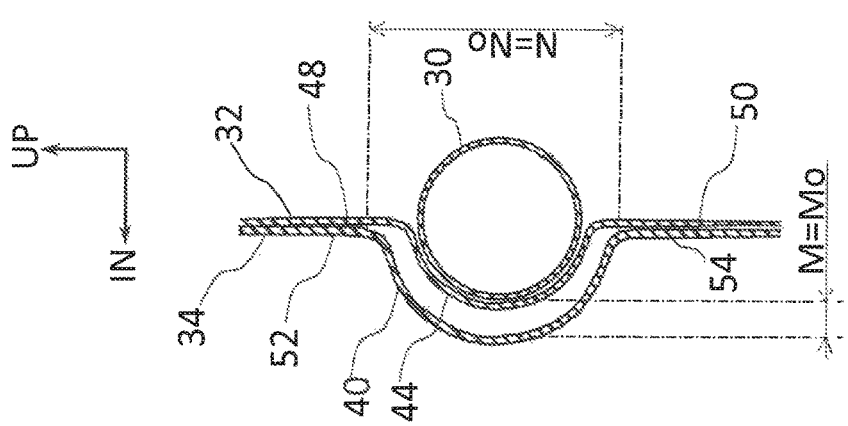
FIG. 19B is a cross sectional view of the outer extension, the inner extension, and the impact beam shown in FIG. 16 taken along line O-O which is perpendicular to the extending axis of the impact beam, viewed from the front of the door.
Figure 19A:
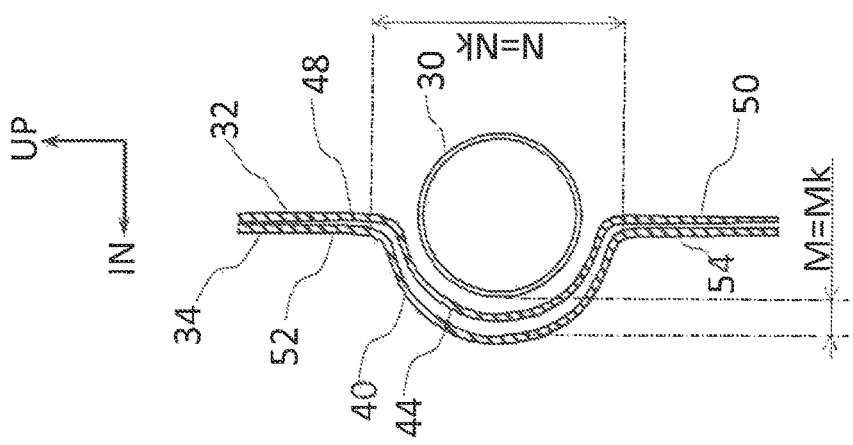
FIG. 19A is a cross sectional view of the outer extension, the inner extension, and the impact beam shown in FIG. 16 taken along line K-K which is perpendicular to an extending axis of the impact beam, viewed from the front of the door.

As shown in FIGS. 5A to 5C and 7A to 7C, the outer extension 32 includes the concave portion 40 which bows transversely inward of the door. The concave portion 40 is connected between the facing edges of the pair of flange portions 48, 50 of the outer extension 32 (between a lower edge of the upper flange portion 48 and an upper edge of the lower flange portion 50). As shown in FIGS. 5A to 5C, the facing edges of the flange portions 48, 50 in the present embodiment are boundaries, in a cross section perpendicular to the extending axis of the impact beam 30, between the concave portion 40 which bows transversely inward of the door and the flange portions 48, 50 extending therefrom up or down. The concave portion 40 extends along the extending axis of the impact beam 30 at around a vertical center of the outer extension 32.

As shown in FIGS. 2 to 5C (refer to, in particular, FIGS. 5A and 5B), the concave portion 40 of the outer extension 32 is deeper towards the inner side of the door, and the distance between the facing edges of the pair of flange portions 48, 50 is longer in an area overlapped in the door side view with one end portion (the front end portion in the present embodiment) of the impact beam 30 than in a longitudinally neighboring area.

<Inner Extension>

As shown in FIG. 1 to FIG. 5C, at one end portion (the front end portion in the present embodiment), the inner extension 34 according to the present embodiment forms the overlapping area L2 in which the inner extension 34 is disposed on a transversely inner side in relation to the outer extension 32 and overlaps the outer extension 32 in the door side view. At the other end which is on the longitudinally center side of the door (the rear side in the present embodiment), the inner extension 34 forms the extension area L3 in which the inner extension 34 rearwardly extends further than the rear end of the outer extension 32. As shown in FIG. 4, the front end of the inner extension 34 forwardly extends further than the front end of the concave portion of the outer extension 32. The inner extension 34 includes the pair of flange portions 52, 54 which extend in the overlapping area L2, and the extension area L3 along the longitudinal axis of the door with the area overlapped with the impact beam 30 in the door side view sandwiched between the pair of flange portions 52, 54.

In the present embodiment, as shown in FIGS. 5A to 5C, the inner extension 34 includes the concave portion 44 which bows transversely inward of the door. The concave portion 44 is connected between the facing edges of the pair of flange portions 52, 54 of the inner extension 34 (between a lower edge of the upper flange portion 52 and an upper edge of the lower flange portion 54). In a cross section (refer to FIG. 5C) perpendicular to the extending axis of the impact beam 30 in a close proximity section A1 (refer to FIG. 4) described below, a distance N between the facing edges of the pair of flange portions 52, 54 is shorter than in a longitudinally neighboring area of the close proximity section A1 (Nb>Nc in FIGS. 5B and 5C). As shown in FIGS. 5A to 5C, the facing edges of the flange portions 52, 54 in the present embodiment are boundaries, in a cross section perpendicular to the extending axis of the impact beam 30, between the concave portion 44 which bows transversely inward of the door and the flange portions 52, 54 extending therefrom up or down.

The concave portion 44 is disposed along the extending axis of the impact beam 30 around a vertically center portion of the inner extension 34 on a rear side. As shown in FIGS. 2 to 5C, the concave portion 44 may be provided throughout the inner extension 34 from the front end of the overlapping area L2 (the same as the front end of the inner extension 34 in the present embodiment) to the rear end of the extension area L3. The concave portion 44 of the inner extension 34 overlaps the impact beam 30 in the door side view. The close proximity section A1 is provided in which a distance Mc along thickness of the door between the concave portion 44 and the impact beam 30 in the extension area L3 is shorter than a distance Mb along thickness of the door between the concave portion 44 and the impact beam 30 in the overlapping area L2. In other words, the close proximity section A1 of the inner extension 34 in the present embodiment is arranged so that a distance M along the thickness of the door between the concave portion 44 and the impact beam 30 is shorter in the area overlapped with the impact beam 30 in the door side view excluding at joint portions 56 (provided on the pair of flange portions 52, 54 as described below) connecting to the outer extension 32 than in a longitudinally neighboring area (the overlapping area L2 in the present embodiment). Although the close proximity section A1 in the present embodiment has a longitudinally neighboring area on one side only, "a neighboring area" in the present disclosure indicates at least one of the longitudinally neighboring areas on both sides. In the close proximity section A1, the inner extension 34 may be in contact with the impact beam 30.

As shown in FIGS. 6 and 7A to 7C, the inner extension 34 includes connecting portions 58 at which the inner extension 34 is secured to the impact beam 30 in a cross section perpendicular to the extending axis of the impact beam 30 including the close proximity section A1. In the present embodiment, the connecting portions 58 are the welded portions 46 of the impact beam 30 described above connecting the impact beam 30 and the inner extension at the concave portion 44 of the inner extension. The welded portions 46 are disposed in the extension area L3 of the inner extension 34.

As shown in FIGS. 2 to 5C, in the present embodiment, the concave portion 44 of the inner extension 34 completely overlaps the concave portion 40 of the outer extension 32 in the door side view from a transversely inner side of the door. Thus, the concave portion 44 of the inner extension 34 completely overlaps, from a transversely inner side of the door, the area in which the outer extension 32 and the impact beam 30 overlap each other in the door side view. In the present embodiment, the concave portion 40 of the outer extension 32 is completely included within the overlapping area L2. Thus, in the present embodiment, the inner extension 34 is disposed on the transversely inner side in relation to the outer extension 32 to form the overlapping area L2, so that the inner extension 34 overlaps not only a portion where the end portion of the impact beam 30 overlaps the outer extension 32 in the door side view but the entire portion where the impact beam 30 overlaps the outer extension 32 in the door side view.

<Flange Portion>

As shown in FIGS. 3 and 5A to 5C, the pair of flange portions 52, 54 of the inner extension 34 are spot welded to the pair of flange portions 48, 50 of the outer extension 32 at two or more joint portions 56. Specifically, the flange portion 52 of the inner extension 34 and the flange portion 48 of the outer extension 32 are welded together, whereas the flange portion 54 of the inner extension 34 and the flange portion 50 of the outer extension 32 are welded together. The joint portions 56 are all included in the overlapping area L2. The joint portions 56 are positioned on the flange portions 52, 54 of the inner extension 34 and the flange portions 48, 50 of the outer extension 32 so that two or more joint portions 56 are spaced apart from each other along the extending axes of the flange portions 52, 54 of the inner extension 34 and the flange portions 48, 50 of the outer extension 32.

In a cross section perpendicular to the extending axis of the impact beam 30, the outer extension 32 and the inner extension 34 form a closed cross section at least partially along the extending axis of the impact beam 30 in the overlapping area L2 (refer to "A" and "B" in FIG. 6). The closed cross section is formed by the pair of flange portions 48, 50 and the concave portion 40 of the outer extension 32, and the pair of flange portions 52, 54 and the concave portion 44 of the inner extension 34.

<Hinge Side Panel>

As shown in FIGS. 1, 2, and 4, the hinge side panel 36 is attached to the door inner panel 20 along a vertical front edge of the door inner panel 20 to reinforce the door inner panel 20. In an area in which the hinge side panel 36 overlaps a front end portion of the outer extension 32 in the door side view, the outer extension 32, the hinge side panel 36, and the door inner panel 20 are all overlapped with and attached to each other.

<Door Check Reinforcement>

As shown in FIG. 4, the door check reinforcement 38 is attached to the hinge side panel 36 on a transversely inner side in relation to the outer extension 32 and the inner extension 34. The door check reinforcement 38 may be further overlapped with and attached to the door inner panel 20 at the portion connected to the hinge side panel 36.

<Processes and Advantages>

Processes and advantages of a vehicle side door according to the first embodiment of the present disclosure are described below. When an inward side-impact load acts on a vehicle from a transversely outer side, the side door 10 receives the load from a transversely outer side such that the impact beam 30 inside the side door 10 also receives the load from the transversely outer side. The load received by the impact beam 30 from the transversely outer side is further transferred from the impact beam 30 to the outer extension 32 and the inner extension 34. In this way, the transversely inward load is received by the outer extension 32 in the area overlapped with the impact beam 30 in the door side view. Because a front end portion of the outer extension 32 is attached to the door inner panel, the load further acts on the outer extension 32 such that the outer extension 32 is deformed towards the end portion of the reinforcing element, while the outer extension 32 stretches transversely inward.

In the present embodiment, in an area excluding at the joint portions 56 connecting to the outer extension 32, the inner extension 34 includes the close proximity section A1 in which a distance M along thickness of the door between the inner extension 34 and the impact beam 30 is shorter than in a longitudinally neighboring area. In this way, deformation of the outer extension 32 in the area overlapped with the inner extension 34 in the door side view can be inhibited. Specifically, a part of the load to be received by the outer extension 32 from the impact beam 30 is first transferred from the impact beam 30 to the inner extension 34 via the close proximity section A1, and then from the inner extension 34 to the joint portions 56 connecting to the outer extension 32. In this way, the load received by the outer extension 32 from the impact beam 30 can be effectively dispersed at the outer extension 32. The inward load along the thickness of the door received by the outer extension 32 in the area overlapped with the impact beam 30 can be dispersed to thereby inhibit contact between the end portion of the impact beam 30 and the outer extension 32 as well as a load concentration in such a contact area.

In the present embodiment, the pair of flange portions 48, 50 of the outer extension 32 and the pair of flange portions 52, 54 of the inner extension 34 are arranged so that each pair sandwich the area overlapped with the impact beam 30 in the door side view. The joint portions 56 connecting the outer extension 32 and the inner extension 34 are provided on the flange portions 48, 50, 52, 54. Thus, the load received by the outer extension 32 can be dispersed via the joint portions 56 on both sides of the area overlapped with the impact beam 30 in the door side view. In this way, the transversely inward load received by the outer extension 32 in the area overlapped with the impact beam 30 can be dispersed to inhibit contact between the end portion of the impact beam 30 and the outer extension 32, as well as a load concentration in such a contact area.

As the joint portions 56 are disposed on the flange portions 48, 50, 52, 54 along the extending axis, the load can be effectively dispersed on the flange portions 48, 50 of the outer extension 32 to inhibit deformation of the outer extension 32 towards a transversely inner side of the door.

In the present embodiment, in the overlapping area L2 in which the outer extension 32 and the inner extension 34 overlap each other in the door side view, the outer extension 32 and inner extension 34 form a closed cross section perpendicular to the extending axis of the impact beam 30. In this way, in the overlapping area L2, deformation of the outer extension 32 towards a transversely inner side and outer side of the door can be effectively inhibited. Thus, the contact between the end portion of the impact beam 30 and the outer extension 32 as well as a load concentration in such a contact area can be inhibited.

In the present embodiment, in a cross section perpendicular to the extending axis of the impact beam 30 including the close proximity section A1 (the extension area L3 in the present embodiment), a distance N between facing edges of the pair of flange portions 52, 54 of the inner extension 34 is shorter than in the overlapping area L2 (Nb>Nc), which is a longitudinally neighboring area. In this way, a relative transverse displacement between the impact beam 30 and the inner extension 34 can be limited. This can achieve an improved load transfer efficiency from the impact beam 30 to the inner extension 34. Specifically, when the load received by the inner extension 34 from the impact beam 30 includes a transverse component, the load can be stably transferred to the inner extension 34 from the impact beam 30. Thus, the load received by the outer extension 32 in the area overlapped with the impact beam 30 to deform the outer extension 32 transversely inward of the door can be effectively dispersed to thereby inhibit contact between the end portion of the impact beam 30 and the outer extension 32 as well as a load concentration in such a contact area.

The close proximity section A1 of the inner extension 34 is provided in the extension area L3. The load from the transversely outer side of the door is efficiently transferred from the impact beam 30 to the inner extension 34, because when a load is received by the impact beam 30 from the transversely outer side of the door, the impact beam 30 displaces more at a rear side than at a front side. A part of the load to be received by the outer extension 32 from the impact beam 30 is transferred first from the impact beam 30 to the inner extension 34, and then from the inner extension 34 to the joint portions 56 connecting to the outer extension 32. In this way, the load received by the outer extension 32 from the impact beam 30 can be effectively dispersed. Thus, deformation of the outer extension 32 can be inhibited in the area overlapped with the inner extension 34 in the door side view so that contact between the end portion of the impact beam 30 and the outer extension 32 as well as a load concentration in such a contact area can be inhibited.

In the present embodiment, because the inner extension 34 is secured to the impact beam 30 at the concave portion 44, a load from the transversely outer side of the door can be efficiently transferred from the impact beam 30 to the inner extension 34. The load is then transferred from the inner extension 34 to the joint portions 56 connecting to the outer extension 32. In this way, the load received by the outer extension 32 from the impact beam 30 can be effectively dispersed. Thus, contact between the end portion of the impact beam 30 and the outer extension 32 as well as a load concentration in such a contact area can be inhibited.

In the present embodiment, in the nonoverlapping area L1 in which the outer extension 32 and the inner extension 34 are not overlapped in the door side view, the impact beam 30 is connected to the door inner panel 20 via the outer extension 32. When a load is received by the impact beam 30 from the transversely outer side of the door, the outer extension 32 which is secured to the door inner panel 20 can be efficiently deformed in the nonoverlapping area L1. Thus, the load can be effectively absorbed.

<Second Embodiment>

A second embodiment is described below. Redundant description of the same or similar elements and advantages as in the first embodiment is omitted in the description below for the second and subsequent embodiments. As shown in FIGS. 8 to 11C, a side door 10 according to the second embodiment includes a close proximity section A2 in an overlapping area L2. Specifically, in the overlapping area L2, a distance M along thickness of the door between the concave portion 44 of the inner extension 34 and the impact beam 30 is shorter in an area in which the concave portion 44 overlaps the impact beam 30 in the door side view excluding at joint portions 56 connecting to the outer extension 32 than in a longitudinally neighboring area of the inner extension 34 (Md>Me, Me<Mf). In the present embodiment, the extension area L3 is not provided. In the present embodiment, in a cross section perpendicular to the extending axis of the impact beam 30 including the close proximity section A2, a distance N between the facing edges of the pair of flange portions 52, 54 of the inner extension 34 is shorter than in a longitudinally neighboring area (Nd>Ne, Ne<Nf).

In the present embodiment, the inner extension 34 includes the close proximity section A2 in the overlapping area L2. A part of a side impact load to be received by the outer extension 32 from the impact beam 30 is first transferred from the impact beam 30 to the inner extension 34 via the close proximity section A2, and then from the inner extension 34 to the joint portions 56 connecting to the outer extension 32. In this way, the load to be received by the outer extension 32 from the inner extension 34 can be effectively dispersed at the outer extension 32. Thus, the inward load along the thickness of the door received by the outer extension 32 in the area overlapped with the impact beam 30 is dispersed such that contact between the end portion of the impact beam 30 and the outer extension 32 as well as a load concentration in such a contact area can be inhibited.

<Third Embodiment>

A third embodiment is described below. As shown in FIGS. 12 to 15D, a side door 10 according to the third embodiment includes a close proximity section A1 in an extension area L3 and another close proximity section A2 in an overlapping area L2. In other words, close proximity sections are provided in the extension area L3 and the overlapping area L2 (Mg>Mh, Mh<Mi, Mi>Mj, and Mh>Mj). In the present embodiment, in each cross section perpendicular to the extending axis of the impact beam 30 including the close proximity section A1 and the close proximity section A2, a distance N between the facing edges of the pair of flange portions 52, 54 of the inner extension 34 is shorter than in neighboring areas. (Ng>Nh, Nh<Ni, and Ni>Nj).

In the present embodiment, the inner extension 34 includes the close proximity section A1 in the extension area L3 and the close proximity section A2 in the overlapping area L2. A part of the side impact load to be received by the outer extension 32 from the impact beam 30 is first transferred from the impact beam 30 to the inner extension 34 via these two areas (close proximity sections A1 and A2) and then, from the inner extension 34 to the joint portions 56 connecting to the outer extension 32. In this way, the load received by the outer extension 32 from the inner extension 34 can be dispersed at the outer extension 32. Thus, the inward load along the thickness of the door received by the outer extension 32 in the area overlapped with the impact beam 30 is dispersed such that contact between the end portion of the impact beam 30 and the outer extension 32 as well as a load concentration in such a contact area can be inhibited.

<Fourth Embodiment>

A fourth embodiment is described below. As shown in FIGS. 16 to 19C, in a side door 10 according to the fourth embodiment, the inner extension 34 forms, at one end (the front end in the first embodiment), a nonoverlapping area L1 in which the inner extension 34 is not overlapped with the outer extension 32 in the door side view. The inner extension 34 with a hinge side panel is connected to a door inner panel at a front end portion in the nonoverlapping area L1 by welding, bolting, or other means. In comparison with the other embodiments, in the fourth embodiment, the outer extension 32 is shorter along the longitudinal axis, while the inner extension 34 is longer along the longitudinal axis. In the present embodiment, the close proximity section A1 is disposed in the extension area L3 (Mk>Mo, Mo<Mp). In the present embodiment, in a cross section perpendicular to the extending axis of the impact beam 30 including the close proximity section A1, a distance N between the facing edges of the pair of flange portions 52, 54 of the inner extension 34 is shorter than in a longitudinally neighboring area (Nk>No, No<Np).

In the present embodiment, the inner extension 34 includes the close proximity section A1 in the extension area L3. A part of side impact load received by the outer extension 32 from the impact beam 30 is first transferred from the impact beam 30 to the inner extension 34 via the close proximity section A1, and then from the inner extension 34 to the joint portions 56 connecting to the outer extension 32. In this way, the load received by the outer extension 32 from the inner extension 34 can be dispersed at the outer extension 32, achieving an effective dispersion of the load. Thus, the inward load along thickness of the door received by the outer extension 32 in the area overlapped with the impact beam 30 is dispersed such that contact between the end portion of the impact beam 30 and the outer extension 32 as well as a load concentration in such a contact area can be inhibited.

<Fifth Embodiment>

A fifth embodiment is described below. As shown in FIG. 20, in a side door 10 according to the fifth embodiment, the present disclosure is applied to not only a front portion of the door inner assembly 18 but also a rear portion.

Although embodiments according to the present disclosure are described above, the present disclosure is not limited to those embodiments. The above embodiments or variations of these embodiments may also be combined as necessary. The present disclosure may be applied in a variety of embodiments within a scope not departing from the principle of the present disclosure. For example, the impact beam may have not a tubular shape but a hollow rectangular column shape.

The invention claimed is:

1. A vehicle door comprising:
  a reinforcing element disposed inside a door of a vehicle and extending along a longitudinal axis of the door, the longitudinal axis defining a longitudinal direction;
  a first bracket to which the reinforcing element is secured, at least a part of the first bracket being disposed transversely inward of the reinforcing element; and
  a second bracket disposed transversely inward of the first bracket in an area in which at least an end portion of the reinforcing element overlaps the first bracket in a door side view, the second bracket having a plurality of joint portions connecting to the first bracket,
  wherein the reinforcing element is secured to the door by one or both of the first bracket and the second bracket, and
  in an overlapping area of the second bracket overlapped with the reinforcing element in the door side view, where the joint portions are not provided, the second bracket includes a close proximity section in which a distance, along a thickness direction of the door, between the second bracket and the reinforcing element is shorter than in a longitudinally neighboring area of the second bracket longitudinally spaced from the close proximity area.

2. The vehicle door according to claim 1, wherein
  each of the first bracket and the second bracket includes a pair of flange portions sandwiching an overlapping area of the first bracket and the second bracket overlapped with the reinforcing element in the door side view,
  the joint portions connect the pair of flange portions of the first bracket to the pair of flange portions of the second bracket, and
  the first bracket and the second bracket form a closed cross section perpendicular to an extending axis of the reinforcing element in at least a part of an area along the extending axis of the reinforcing element in an area in which the first bracket and the second bracket overlap each other in the door side view.

3. The vehicle door according to claim 2, wherein
  between the pair of flange portions of the second bracket, the second bracket comprises a concave portion which bows transversely inward of the door and is connected between facing edges of the pair of flange portions of the second bracket, and
  in a cross section perpendicular to the extending axis of the reinforcing element including the close proximity section, a distance between the facing edges of the pair of flange portions of the second bracket is shorter than in the longitudinally neighboring area.

4. The vehicle door according to claim 1, wherein
  the second bracket comprises an extension area which extends further towards a center of the door in relation to a center-side end portion of the first bracket, and
  the close proximity section of the second bracket is disposed in the extension area.

5. The vehicle door according to claim 1, wherein
  in a cross section of the second bracket perpendicular to an extending axis of the reinforcing element including the close proximity section, the second bracket comprises a connecting portion at which the second bracket is secured to the reinforcing element.

6. The vehicle door according to claim 4, wherein in a cross section of the second bracket perpendicular to an extending axis of the reinforcing element including the close proximity section, the second bracket comprises a connecting portion at which the second bracket is secured to the reinforcing element.

7. The vehicle door according to claim 1, wherein in a nonoverlapping area in which the first bracket and the second bracket do not overlap each other in the door side view, the reinforcing element is attached to a door inner panel of the door by either one of the first bracket and the second bracket.

8. The vehicle door according to claim 4, wherein in a nonoverlapping area in which the first bracket and the second bracket do not overlap each other in the door side view, the reinforcing element is attached to a door inner panel of the door by either one of the first bracket and the second bracket.

9. The vehicle door according to claim 5, wherein in a nonoverlapping area in which the first bracket and the second bracket do not overlap each other in the door side view, the reinforcing element is attached to a door inner panel of the door by either one of the first bracket and the second bracket.

10. The vehicle door according to claim 6, wherein in a nonoverlapping area in which the first bracket and the second bracket do not overlap each other in the door side view, the reinforcing element is attached to a door inner panel of the door by either one of the first bracket and the second bracket.

\* \* \* \* \*